US006266683B1

(12) United States Patent
Yehuda et al.

(10) Patent No.: US 6,266,683 B1
(45) Date of Patent: *Jul. 24, 2001

(54) COMPUTERIZED DOCUMENT MANAGEMENT SYSTEM

(75) Inventors: Issac Yehuda, Forest Hills, NY (US); Jeffery D. Gimprich, River Vale, NJ (US); Leonid Chernov, Brooklyn, NY (US); Melissa E. Anderson, New York, NY (US); Gautam B. Desai, New York, NY (US); David L. Gusick, New York, NY (US); William J. Graham, Westfield, NJ (US)

(73) Assignee: The Chase Manhattan Bank, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/900,075

(22) Filed: Jul. 24, 1997

(51) Int. Cl.[7] .............................. G06F 17/21; G06F 13/00
(52) U.S. Cl. ................................................ 707/512; 709/204
(58) Field of Search ............................ 707/500, 509–513, 707/530, 100–104; 709/200–207, 217, 9, 10

(56) References Cited

U.S. PATENT DOCUMENTS

| 5,353,388 | * | 10/1994 | Motoyama | 395/117 |
|---|---|---|---|---|
| 5,669,007 | * | 9/1997 | Tateishi | 395/779 |
| 5,704,060 | * | 12/1997 | Del Monte | 395/600 |
| 5,800,181 | * | 9/1998 | Heinlein et al. | 434/322 |
| 5,806,068 | * | 9/1998 | Shaw et al. | 707/103 |
| 5,819,300 | * | 10/1998 | Kohno et al. | 707/511 |
| 5,884,262 | * | 3/1999 | Wise et al. | 704/270 |

* cited by examiner

Primary Examiner—Kim Vu
Assistant Examiner—Alford W. Kindred
(74) Attorney, Agent, or Firm—Ostrolenk, Faber, Gerb & Soffen, LLP

(57) ABSTRACT

A computerized document management system for managing a document acted upon by at least one participant in creating, evaluating or revising the document is provided. The system includes a segmenter which divides the document into a plurality of segments based on the content of the document. The system also includes a comment receiver which receives comments from at least one participant, at least a portion of the comments pertaining to at least one of the plurality of segments of the document. The system further includes a comment associator which associates each comment of the portion of comments to the segment to which the each comment pertains.

48 Claims, 19 Drawing Sheets

| 304 | 306 | 308 | 310 | 312 | 314 | 316 | 320 | 322 |
|---|---|---|---|---|---|---|---|---|
| COMMENT ID | USER ID | PROJECT ID | VERSION ID | TIME STAMP | COMMENT TEXT | SUBJECT | SEGMENT FILE NAME | SEGMENT NAME |
| 714 | CDM1 | ABC | 1 | 4/3/97 09:32:50 | [COMMENT] | ARTICLE 1 | DOC.0.3 | ARTICLE 1 |
| 715 | CDC2 | DEF | 1 | 4/3/97 09:32:53 | [COMMENT] | SECTION 3.02 | DOC.0.3.02 | SECTION 3.02 |
| 716 | IFKC6 | GHI | 1 | 4/3/97 09:32:57 | [COMMENT] | ENTIRE DOCUMENT | DOC.1.0 | ENTIRE DOCUMENT |

FIG. 8A

| 344 | 346 | 348 |
|---|---|---|
| COMMENT ID | USER ID | STATUS |
| 714 | CDM1 | UNREAD |
| 715 | CDC2 | READ |
| 716 | IFKC6 | UNREAD |

DOCUMENT MANAGEMENT SYSTEM
SYSTEM FEEDBACK OPTIONS HELP

ALL/CLEAN ▼   PRINT|COMMENT|NEXT

CDC DEAL  IOD: DIST 1 - 6/12/97 3:30:41 PM / CREDIT AGREEMENT
         TOC: ARTICLE I/ SECTION 1.01

SECTION 1.01. DEFINED TERMS. AS USED IN THIS AGREEMENT, THE FOLLOWING TERMS HAVE THE MEANINGS SPECIFIED BELOW:

"ADJUSTED BASE RATE" MEANS, FOR AN DAY, A RATE PER ANNUM EQUAL TO THE GREATER OF (A) THE PRIME RATE IN EFFECT ON SUCH DAY AND (B) THE FEDERAL FUNDS EFFECTIVE RATE IN EFFECT ON SUCH DAY PLUS 1/2 OF 1%. ANY CHANGE IN THE ADJUSTED BASE RATE DUE TO A CHANGE IN THE PRIME RATE OR THE FEDERAL FUNDS EFFECTIVE RATE SHALL BE EFFECTIVE FROM AND INCLUDING THE EFFECTIVE DATE OF SUCH CHANGE IN THE PRIME RATE OR THE FEDERAL FUNDS EFFECTIVE RATE, RESPECTIVELY. ⌐212

"ADJUSTED LIBO RATE" MEANS, WITH RESPECT TO ANY EURODOLLAR BORROWING FOR ANY INTEREST PERIOD, AN INTEREST RATE PER ANNUM (ROUNDED UPWARDS, IF NECESSARY, TO THE NEXT 1/16 OF 1%) EQUAL TO (A) THE LIBO RATE FOR SUCH INTEREST PERIOD MULTIPLIED BY(B) THE STATUTORY RESERVE RATE. ⌐212

"ADMINISTRATIVE AGENT" MEANS TORONTO DOMINION (TEXAS) INC., IN ITS CAPACITY AS ADMINISTRATIVE AGENT FOR THE LENDERS HEREUNDER.

"ADMINISTRATIVE QUESTIONNAIRE" MEANS AN ADMINISTRATIVE QUESTIONNAIRE IN A FORM SUPPLIED BY THE ADMINISTRATIVE AGENT.

"AFFILIATE" MEANS, WITH RESPECT TO A SPECIFIED PERSON, ANOTHER PERSON THAT DIRECTLY, OR INDIRECTLY THROUGH ONE OR MORE INTERMEDIARIES, CONTROLS OR IS CONTROLLED BY OR IS UNDER COMMON CONTROL WITH THE PERSON SPECIFIED.

"AGENTS" MEANS THE ADMINISTRATIVE AGENT AND THE COLLATERAL AGENT.

CDC DEAL  TOD: DIST 1 - 6/12/97 3:30:41 PM / CREDIT AGREEMENT
TOC: ARTICLE 1/ SECTION 1.01

SECTION 1.01. DEFINED TERMS. AS USED IN THIS AGREEMENT, THE FOLLOWING TERMS HAVE THE MEANINGS SPECIFIED BELOW:

"ADJUSTED BASE RATE" MEANS, FOR AN DAY, A RATE PER ANNUM EQUAL TO THE GREATER OF (A) THE PRIME RATE IN EFFECT ON SUCH DAY AND (B) THE FEDERAL FUNDS EFFECTIVE RATE IN EFFECT ON SUCH DAY PLUS 1/2 OF 1%. ANY CHANGE IN THE ADJUSTED BASE RATE DUE TO A CHANGE IN THE PRIME RATE OR THE FEDERAL FUNDS EFFECTIVE RATE SHALL BE EFFECTIVE FROM AND INCLUDING THE EFFECTIVE DATE OF SUCH CHANGE IN THE PRIME RATE OR THE FEDERAL FUNDS EFFECTIVE RATE, RESPECTIVELY.

"ADJUSTED LIBO RATE" MEANS, WITH RESPECT TO ANY EURODOLLAR BORROWING FOR ANY INTEREST PERIOD, AN INTEREST RATE PER ANNUM (ROUNDED UPWARDS, IF NECESSARY, TO THE NEXT 1/16 OF 1%) EQUAL TO (A) THE LIBO RATE FOR SUCH INTEREST PERIOD MULTIPLIED BY(B) THE STATUTORY RESERVE RATE.

"ADMINISTRATIVE AGENT" MEANS TORONTO DOMINION (TEXAS) INC., IN ITS CAPACITY AS ADMINISTRATIVE AGENT FOR THE LENDERS HEREUNDER.

"ADMINISTRATIVE QUESTIONNAIRE" MEANS AN ADMINISTRATIVE QUESTIONNAIRE IN A FORM SUPPLIED BY THE ADMINISTRATIVE AGENT.

"AFFILIATE" MEANS, WITH RESPECT TO A SPECIFIED PERSON, ANOTHER PERSON THAT DIRECTLY, OR INDIRECTLY THROUGH ONE OF MORE INTERMEDIARIES, CONTROLS OR IS CONTROLLED BY OR IS UNDER COMMON CONTROL WITH THE PERSON SPECIFIED.

"AGENTS" MEANS THE ADMINISTRATIVE AGENT AND THE COLLATERAL AGENT.

"ADMINISTRATIVE QUESTIONNAIRE" MEANS AN ADMINISTRATIVE QUESTIONNAIRE IN A FORM SUPPLIED BY THE ADMINISTRATIVE AGENT.

DOCUMENT MANAGEMENT SYSTEM
SYSTEM FEEDBACK OPTIONS HELP

ALL/CLEAN ▼   PRINT | COMMENT | NEXT

CDC DEAL  IOD: DIST 1 – 6/12/97 3:30:41 PM / CREDIT AGREEMENT
          IDC: ARTICLE I / SECTION 1.01

SECTION 1.01. DEFINED TERMS. AS USED IN THIS AGREEMENT, THE FOLLOWING TERMS HAVE THE MEANINGS SPECIFIED BELOW:

"ADJUSTED BASE RATE" MEANS, FOR ANY DAY, A RATE PER ANNUM EQUAL TO THE GREATER OF (A) THE PRIME RATE IN EFFECT ON SUCH DAY AND (B) THE FEDERAL FUNDS EFFECTIVE RATE IN EFFECT ON SUCH DAY PLUS 1/2 OF 1%. ANY CHANGE IN THE ADJUSTED BASE RATE DUE TO A CHANGE IN THE PRIME RATE OR THE FEDERAL FUNDS EFFECTIVE RATE SHALL BE EFFECTIVE FROM AND INCLUDING THE EFFECTIVE DATE OF SUCH CHANGE IN THE PRIME RATE OR THE FEDERAL FUNDS EFFECTIVE RATE, RESPECTIVELY.

COPY/PASTE  SHOW RECEIPIENTS  SAVE  SEND  CANCEL
            —254        —255      —251  —250 —252

TO: —248   BCDC COUNSEL —246
FROM:      SYNDICATE A – KENNETH LANGSTON —245
DATE:      07/17/97 13:13:57 —247
SUBJECT:   SECTION 1.01 —249
COMMENT:   THIS IS MY COMMENT. —244

—242
—200
—24

DOCUMENT MANAGEMENT SYSTEM
SYSTEM FEEDBACK    OPTIONS    HELP

ALL/CLEAN ▼    PRINT | COMMENT | NEXT

CDC DEAL    TOD: DIST 1 – 6/12/97 3:30:41 PM / CREDIT AGREEMENT
            TOC: ARTICLE I / SECTION 1.01

SECTION 1.01. DEFINED TERMS. AS USED IN THIS AGREEMENT, THE FOLLOWING TERMS HAVE THE MEANINGS SPECIFIED BELOW:

"ADJUSTED BASE RATE" MEANS, FOR ANY DAY, A RATE PER ANNUM EQUAL TO THE GREATER OF (A) THE PRIME RATE IN EFFECT ON SUCH DAY AND (B) THE FEDERAL FUNDS EFFECTIVE RATE IN EFFECT ON SUCH DAY PLUS 1/2 OF 1%. ANY CHANGE IN THE ADJUSTED BASE RATE DUE TO A CHANGE IN THE PRIME RATE OR THE FEDERAL FUNDS EFFECTIVE RATE SHALL BE EFFECTIVE FROM AND INCLUDING THE EFFECTIVE DATE OF SUCH CHANGE IN THE PRIME RATE OR THE FEDERAL FUNDS EFFECTIVE RATE, RESPECTIVELY.

| MOVE TO UNREAD | MOVE TO ARCHIVE | REPLY | REPLY ALL | CLOSE |

DATE:    07/17/97 1:16:40 PM —247
FROM:    SYNDICATE A – KENNETH LANGSTON—245
SUBJECT: SECTION 1.01—249
COMMENT: THIS IS MY COMMENT.—244
TO:      CDC – ROBERT MACHADO
         CDC – ROBERT ANASTASIO —281
         CDC – MELISSA ANDERSON

FIG. 10E

DOCUMENT MANAGEMENT SYSTEM
SYSTEM FEEDBACK   OPTIONS   HELP

CDC DEAL  TOD: DIST 1 — 6/12/97 3:30:41 PM / CREDIT AGREEMENT
          TOC: ARTICLE I / SECTION 1.01                              ALL/CLEAN   PRINT | COMMENT | NEXT

SECTION 1.01. DEFINED TERMS. AS USED IN THIS AGREEMENT, THE FOLLOWING TERMS HAVE THE MEANINGS SPECIFIED BELOW:

"ADJUSTED BASE RATE" MEANS, FOR ANY DAY, A RATE PER ANNUM EQUAL TO THE GREATER OF (A) THE PRIME RATE IN EFFECT ON SUCH DAY AND (B) THE FEDERAL FUNDS EFFECTIVE RATE IN EFFECT ON SUCH DAY PLUS 1/2 OF 1%. ANY CHANGE IN THE ADJUSTED BASE RATE DUE TO A CHANGE IN THE PRIME RATE OR THE FEDERAL FUNDS EFFECTIVE RATE SHALL BE EFFECTIVE FROM AND INCLUDING THE EFFECTIVE DATE OF SUCH CHANGE IN THE PRIME RATE OR THE FEDERAL FUNDS EFFECTIVE RATE, RESPECTIVELY.

COPY/PASTE   SAVE | SEND | CANCEL —292

TO:       SYNDICATE A — KENNETH LANGSTON
FROM:     SYNDICATE A — ROBERT MACHADO
DATE:     07/17/97 13:28:49
SUBJECT:  SECTION 1.01
COMMENT:  THIS IS A REPLY TO YOUR COMMENT REGARDING ARTICLE I.

FIG. 10F

COMPUTERIZED DOCUMENT MANAGEMENT SYSTEM

BACKGROUND OF THE INVENTION

The present invention is directed to a computerized document management system, and more particularly to a computerized document management system which facilitates the viewing and evaluation of documents by a plurality of participants in the creation and revision of the document by providing advanced document segmentation, on-the-fly definition presentation, and linked and context-sensitive document comments created by the plurality of participants.

Many word processing documents are created by a sole author and are thereafter subject to revision by the original author alone. In such documents, it is relatively easy for the sole author to evaluate and revise the document. Typically, the author can simply print out a hard copy of the document, inscribe written comments on various portions of the hard copy of the document where such comments are pertinent, and thereafter revise the document on a word processor or the like with reference to the comments made on the hard copy.

In many fields, however, it is often desirable to make a single document reflect the contributions of numerous individuals. For example, documents embodying written agreements which define legal or financial rights and obligations among several parties are frequently written, commented upon, and ultimately revised based on the comments of many participants in the creation of the ultimate document. Such participants might include the parties affected by the document, attorneys representing such parties, financial institutions, and the like.

The creation, commenting upon and revision of such documents becomes exponentially more difficult as the number of participants in the document creation process increases. A threshold problem arises in distributing a specific version of the document to all participants at substantially the same time. If a version of a document is not distributed to all participants virtually simultaneously, it is difficult to ensure that all participants are evaluating and commenting upon the same version of the document. This problem becomes even more acute when the participants are geographically dispersed. Even if the document can be distributed to all participants in a rapid and controlled manner, it is highly inefficient for the participants to utilize the standard method of commenting on the document by printing out hard copies of the document and inscribing comments thereupon. These hard copies would need to be mailed or otherwise transmitted to a central revisionist controlling the revisions of the document, whose task of compiling and organizing the comments in a manner permitting an intelligent revision of the document would be made extremely difficult by the many disparate written comments.

As an alternative, the participants may choose to mail or electronically mail their comments on a version of the document to such a revisionist. However, since the comments of each participant would be contained in a single electronic mail message pertaining to the whole document, the central revisionist's burden of collating and organizing the comments intelligently would not be eased. In fact, given the ease with which such comments may be sent by electronic mail, participants may be more likely to send lengthy and unorganized comments, thereby making the revisionist's task even more difficult.

Finally, many multi-participant documents such as those described above are lengthy and incorporate terms having specialized definitions. Each participant's duty to evaluate each version of the document is made difficult by the length and lexicography embodied in each such document. For example, each time a participant encounters a term having a specialized definition set forth elsewhere in the document, the participant must typically locate the definition manually, and must thereafter manually find and return to the location in the text where the defined term appeared to continue reading. Moreover, the number and identification of such defined terms, as well as their definitions themselves, are subject to change from version to version, thereby increasing the difficulty of each participant's evaluation of each version of the document.

Document management systems have been created which enable participants to edit drafts of a document and to send these edited drafts to other participants for evaluation. These document management systems operate on a so-called "version management" principle by merely managing the versions of the documents revised by the participants. These prior art "version management" document management systems suffer, however, because the documents themselves may be changed by every participant, thereby complicating the process of document revision with controlled evaluation, analysis and comment by each participant so as to incorporate the desired changes of all participants in each revision of the document. These prior art document management systems also fail to organize and relate participants' comments to portions of the document affected by the comments, and also fail to facilitate a participant's reference to defined terms.

Accordingly, there is a need for a document management system which: (a) allows potentially geographically dispersed participants to efficiently and intelligently evaluate documents and to communicate comments regarding such documents; (b) allows such participants to readily recognize the changes made between different versions of the same document and to view such changes only, if desired; (c) organizes such comments intelligently with respect to the document context of each comment; (d) facilitates evaluation of the document by participants by improving the automated presentation of defined terms; and (e) facilitates the rapid and accurate preparation of each version of the document.

SUMMARY OF THE INVENTION

Generally speaking, a computerized document management system for managing a document acted upon by at least one participant in creating, evaluating or revising the document is provided. The system includes a segmenter which divides the document into a plurality of segments based on the content of the document. The system also includes a comment receiver which receives comments from at least one participant, the comments pertaining to at least one of the plurality of segments of the document. The system further includes a comment associator which associates each comment with the at least segment to which the comment pertains.

Accordingly, it is an object of the present invention to efficiently distribute documents to geographically dispersed individuals at a participant's convenience over a public or private network using a browser-based approach connecting to a server.

Another object of the present invention is to highlight incremental changes between any pair of successive document versions.

A further object of the present invention is to parse a document into segments based upon the content of the document.

Still another object of the present invention is to collect, group and display participants' comments on a specific document segment together with such segment for easy access by participants or by a central revisionist for the document.

A still further object of the present invention is to display the collected comments of the participants grouped together with the relevant segment to which the comments pertain.

Yet another object of the present invention is to collect, group and display, for any document, only those segments of the document which have undergone revision since the prior version of the document.

A yet still further object of the present invention is to track, label and display various versions of a document.

Yet another object of the present invention is to limit any participant's access solely to projects to which the participant is permitted access.

Yet another object of the present invention is to present, at a participant's demand, the definition of any term defined within a document in context with any use of such term.

Yet another object of the present invention is to enable the printout of original document counterpart copies at each participant's remote location for execution and delivery as appropriate.

Other features and advantages of the present invention will become apparent from the following description of the invention which refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangement and instrumentality shown.

FIGS. 8A and 8B depict data structures used by the document management system of the present invention for storing and managing comments pertaining to documents and document segments;

FIGS. 9A–9C depict the viewing and navigation of a document by a participant in accordance with the document management system of the present invention; and FIGS. 10A–10F depict the creation and viewing of document comments by a participant in accordance with the document management system of the present invention.

DETAILED DESCRIPTION OF EMBODIMENTS OF THE INVENTION

Figure 1:
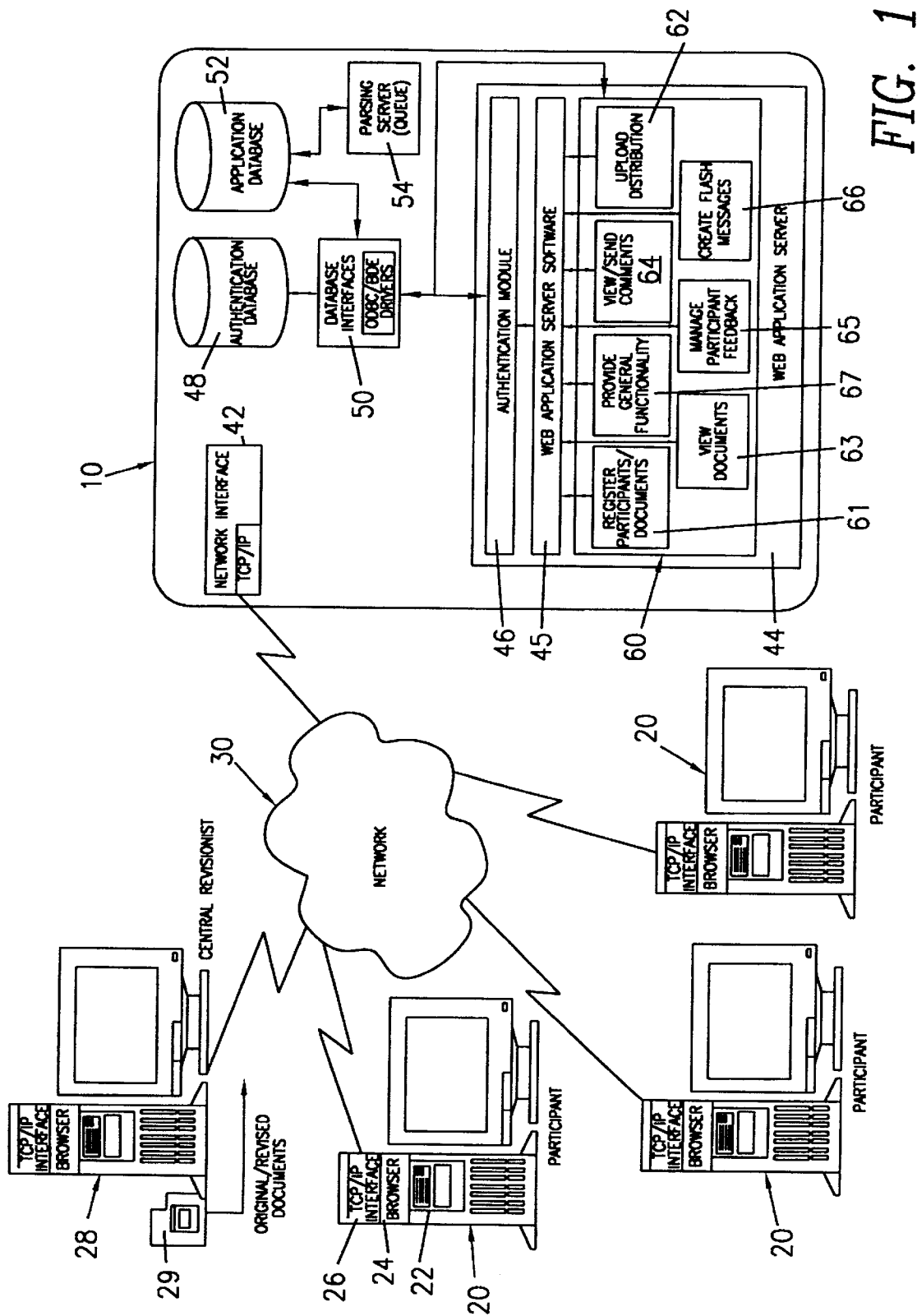
FIG. 1 is a block diagram of a document management system of the present invention and illustrating connection to a network connecting participants in a document evaluation and revision process in accordance with the present invention.

Reference is now made to FIG. 1, in which a document management system 10, constructed in accordance with the present invention, is shown. Generally speaking, document management system 10 and participants 20 are linked through a network 30 which is preferably a computer network. Network 30 may comprise a LAN, a WAN, a local or regional intranet, an extranet or the global Internet. Network 30 may be a public or private network. Each participant 20 comprises a computer 22, such as a personal computer, operated by a human participant (not shown) in the creation and/or revision of one or more documents managed by document management system 10. Each participant 20 may access the document management system 10 using its computer 22, which is connected to the network 30 and which has software such as a browser 24 providing connectivity to and operability with the network 30 and the document management system 10.

Although not necessary to the invention, document management system 10 preferably utilizes an HTML paradigm, well-known in the art, and may further utilize additional well-known technologies such as JavaScript and Delphi. Document management system 10 therefore preferably incorporates a well-known TCP/IP network interface 42 and a web application server 44, including web application server software 45. Likewise, each computer 22 is preferably provided with a TCP/IP interface 26 and the browser 24 is preferably an HTML-compatible browser. Similarly, network 30 is preferably a TCP/IP network. In this manner, document management system 10 can be provided over the World Wide Web, or over a World Wide Web-type application network. Since the HTML paradigm is preferred, the discussion herein will refer to this preferred HTML embodiment, although it is to be understood that the invention encompasses similar or equivalent components and functionality embodied in non-HTML environments as well.

Document management system 10 preferably includes a user authentication module 46 which provides security for the document management system 10 and ensures that only authorized users, including participants, are permitted to access the document management system 10, and that users can only access those projects and modules (described below) for which they are authorized. The authentication module 46 connects to an authentication database 48 through a database interface unit 50 having well-known ODBC/BDE drivers.

Document management system 10 includes several application modules 60. The application modules 60 connect to an application database 52 through the database interface 50. Document management system 10 may include a project, participant and document registration module 61 which enables the identification of new projects, participants and documents to the document management system 10. Registration module 61 also enables access rights of various participants to various projects and documents to be changed or authorized, and allows new projects, participants and documents to be identified in the document management system 10 for use thereby. Registration module 61 further allows projects, participants and documents to be removed from the document management system 10, and allows participants to be matched or linked with particular projects and documents registered in the system. Registration module 61 may operate in conjunction with user authentication module 46 to permit only selected registered participants to access, view and comment upon particular registered projects and documents.

Document management system 10 may further include an upload distribution module 62 which allows a central revisionist 28 to upload original and/or revised versions of documents 29 to the document management system 10. The central revisionist 28 may or may not also be a participant 20 and may either connect to document management system 10 via network 30 or, alternatively, central revisionist 28 may access document management system 10 directly.

Document management system 10 may include a document viewing module 63 which permits documents to be navigated and viewed by participants 20 as will be described below.

Document management system 10 may include a comment view/send module 64 which allows participants 20 and/or a central revisionist 28 to view comments submitted by participants 20 regarding a document and to create and submit new comments. Document management system 10 may also include a participant feedback management module 65 which solicits messages made by participants 20 regarding the document management system 10. The feedback management module 65 may distribute these messages to an external database for further processing.

Document management system 10 may further include several housekeeping components such as flash message creation module 66 which provides "flash messages" to participants 20 linked to document management system 10, advising participants 20 of important or any other relevant information concerning documents under revision. A general functionality module 67 may also be included to provide the look and feel and access control for the document management system 10, including displaying appropriate buttons and other interactive components and providing connections to and between application modules 60.

Finally, document management system 10 includes a document parsing server or queue 54 which parses new and revised versions of documents in accordance with the present invention as will be described below.

Document management system 10 receives, processes, and tracks "projects" of related documents. Document management system 10 further receives, processes and tracks "distributions" of the documents in a particular project. Each project, together with an associated central revisionist, is preferably registered within the document management system 10 using registration module 61. Participants are preferably registrable at any time.

Figure 2A:
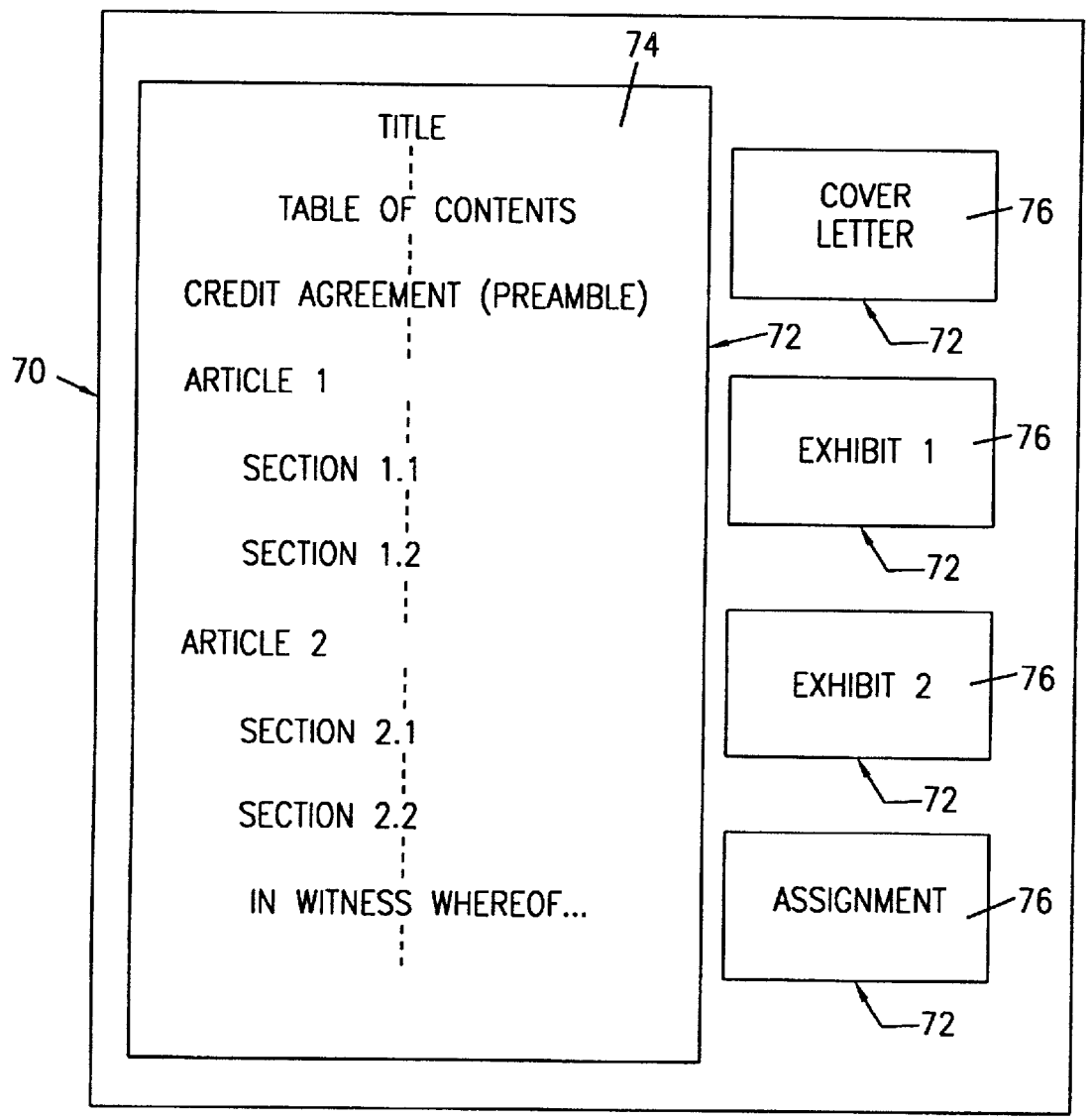
FIG. 2A depicts a group of documents comprising a distribution which are managed and processed by the document management system of the present invention.

As shown in FIG. 2A, a distribution 70 is a collection of a single version or revision of some or all of the related documents 72 in a particular project. That is, all documents 72 in a particular distribution 70 are preferably associated with the same version or revision of the project documents. The original version of each document 72 is typically found in the first distribution 70 for the project, and subsequent versions of the documents 72 for the project will typically be found in later, sequential distributions 70.

Each distribution 70 may include all of the documents 72 contained in the original distribution or, in distributions subsequent to the original distribution, each distribution 70 may include only those documents 72 which have been revised. In the latter case, the document management system 10 preferably stores all distributions so that a document 72 which has not been revised in the most recent distribution 70 may be viewed by retrieving the last revision of the document 72 from an earlier distribution 70. Moreover, in the case of distributions subsequent to the original distribution, it is preferable to keep a copy of each document 72 in a clean (revised) format, as well as one or more additional revision formats which indicate changes from the preceding version, such as by use of carets, strikeout or the like.

Each distribution 70 may include one or more divisible documents 74 and/or one or more indivisible documents 76. A divisible document 74 is a document which may be divided into two or more sub-parts or "segments" based on the content of the document. For example, Credit Agreements for Syndicated Loan Systems, multi-party legal agreements, and any document adhering to certain structural rules which enable the document to be parsed in accordance with the present invention as described below may comprise divisible documents 74. Indivisible documents 76 are documents which do not adhere to such structural rules or which simply are not desired to be divided. As discussed below, the divisibility of a document into segments enables participants 20 to comment upon the individual segments of the divisible document 74 as opposed to merely commenting on the document as a whole. In particular, the document management system 10 of the present invention parses divisible documents 74 and associates comments received from participants 20 with the segments of the documents to which they pertain. Whether a document is a divisible document 74 or an indivisible document 76 is preferably determined by parsing the document itself and searching for recognizable structure which enables the document to be segmented.

Figure 3:
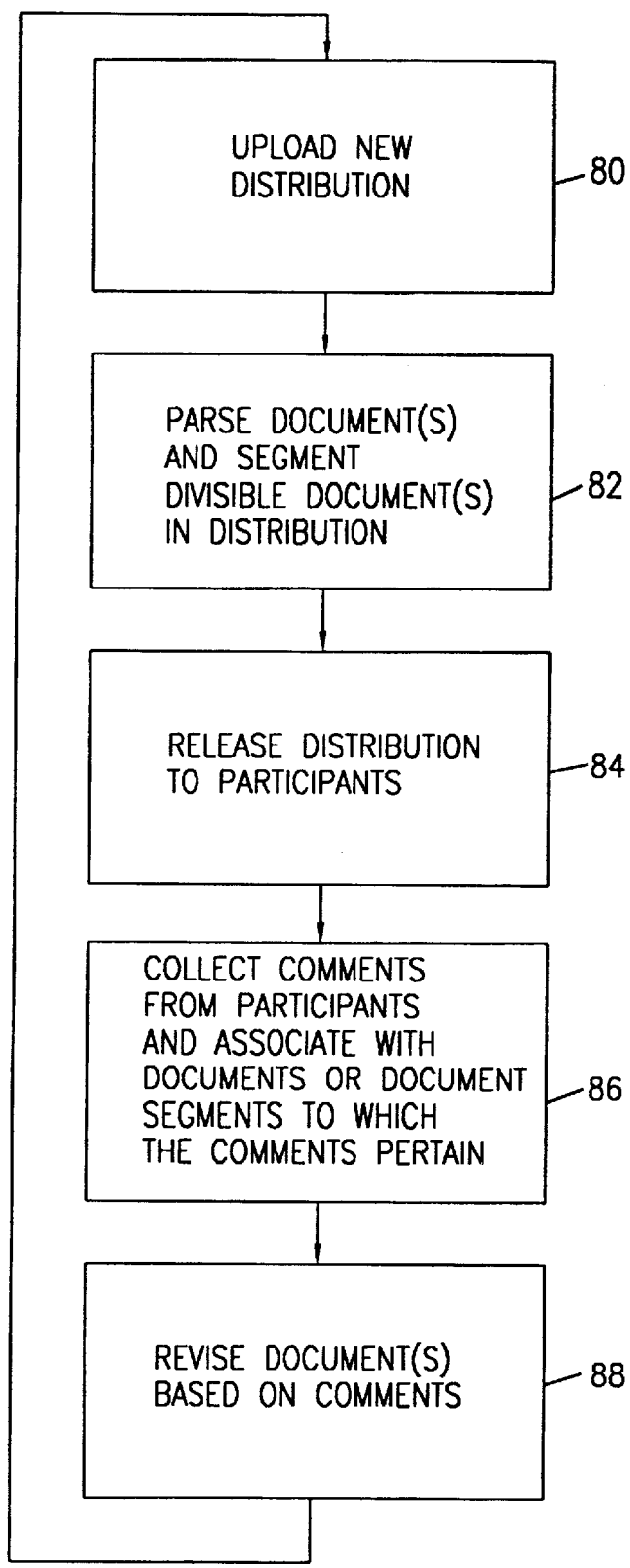
FIG. 3 is a flow diagram illustrating processing performed by the document management system of the present invention.

The processes employed by document management system 10 will now be described with reference to FIGS. 3–8. As shown in FIG. 3, a document management process of the present invention begins with a new distribution upload procedure 80. A new distribution may be an original distribution (including the original version of each document in a particular project) or a revision distribution (including revised versions of such documents). New distributions are preferably uploaded by an administrator such as central revisionist 28 by using upload distribution module 62 (FIG. 1).

Figure 4:
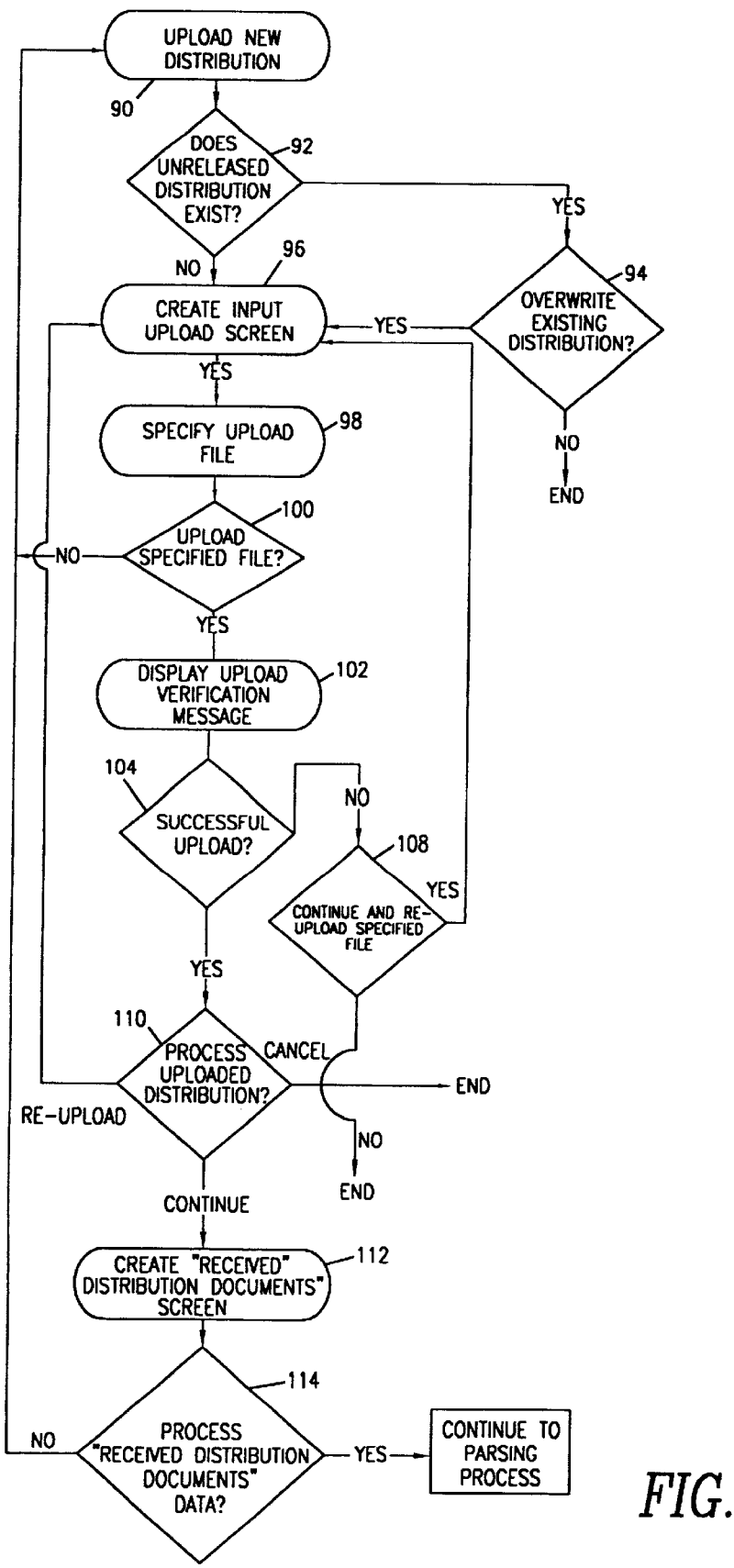
FIG. 4 is a flow diagram illustrating a new distribution uploading procedure of the document management system of the present invention.

FIG. 4 is a flow diagram depicting the new distribution upload procedure 80 of FIG. 3 as performed by the upload distribution module 62. New distribution upload procedure 80 is typically initiated in a step 90 by an administrator who is, in most cases, the central revisionist 28 who has recently created a new distribution with original or revised documents. Processing preferably begins by checking for the presence of a previously uploaded but unreleased distribution in a step 92. An unreleased distribution is a distribution which has been uploaded but is not in condition for release to participants 20 for review and comment. If an unreleased distribution is found, the administrator is asked whether to overwrite the unreleased distribution in a step 94. If the administrator chooses not to overwrite the unreleased distribution, the new distribution upload procedure 80 ends. If the administrator does choose to overwrite the existing unreleased distribution, or if no previously uploaded and unreleased distribution is found in step 92, then an input upload screen is created in a step 96.

A new distribution, including any divisible documents 74 for parsing and segmenting in accordance with the present invention as well as any accompanying indivisible documents 76, is preferably uploaded as a single distribution file. This distribution file serves as a container for all of the documents 72 in the distribution 70 and is preferably compressed in a manner known in the art to save storage space and to speed uploading. Accordingly, the administrator is requested to specify a distribution file for uploading in a step 98. Alternatively, the new distribution uploading procedure 80 may browse or search to locate a distribution file that is ready for processing. Such a distribution file may be copied into a known directory for this purpose and may contain a file name or extension identifying the file as a distribution file.

After the distribution file is specified and/or located as described, the administrator may be given the option to confirm the upload of the specified distribution file in a step 100. If the administrator opts to upload the distribution file, an upload verification message is displayed in a step 102 and the success of the upload is checked in a step 104. If the upload was unsuccessful, the administrator is given the option to continue and attempt to re-upload the specified distribution file or to cancel and end the upload procedure in a step 108.

Once the distribution file has been successfully uploaded in step 104, the administrator is given the option of continuing processing with the uploaded distribution file, re-uploading, or cancelling in a step 110. To continue processing the uploaded distribution file, a message is displayed to the administrator in a step 112 notifying the administrator that the distribution, including the documents included therein, has been received. Finally, the administrator is given the option of processing the received distribution documents or cancelling in a step 114. If the administrator elects to process the distribution documents, document management system 10 will engage a parsing procedure 82 shown in FIG. 3.

After a new distribution 70 has been uploaded, documents 72 therein are parsed by a parsing procedure 82. Parsing procedure 82 parses the divisible documents 74 and creates individual data structures called "segments", each of which includes the contents of one or more sub-parts of the divisible document 74. Parsing procedure 82 also saves each indivisible document 76 as its own segment. Parsing procedure 82 further creates hyperlinks for all defined terms in the document, if any, in a manner which will be described below.

Figure 5:
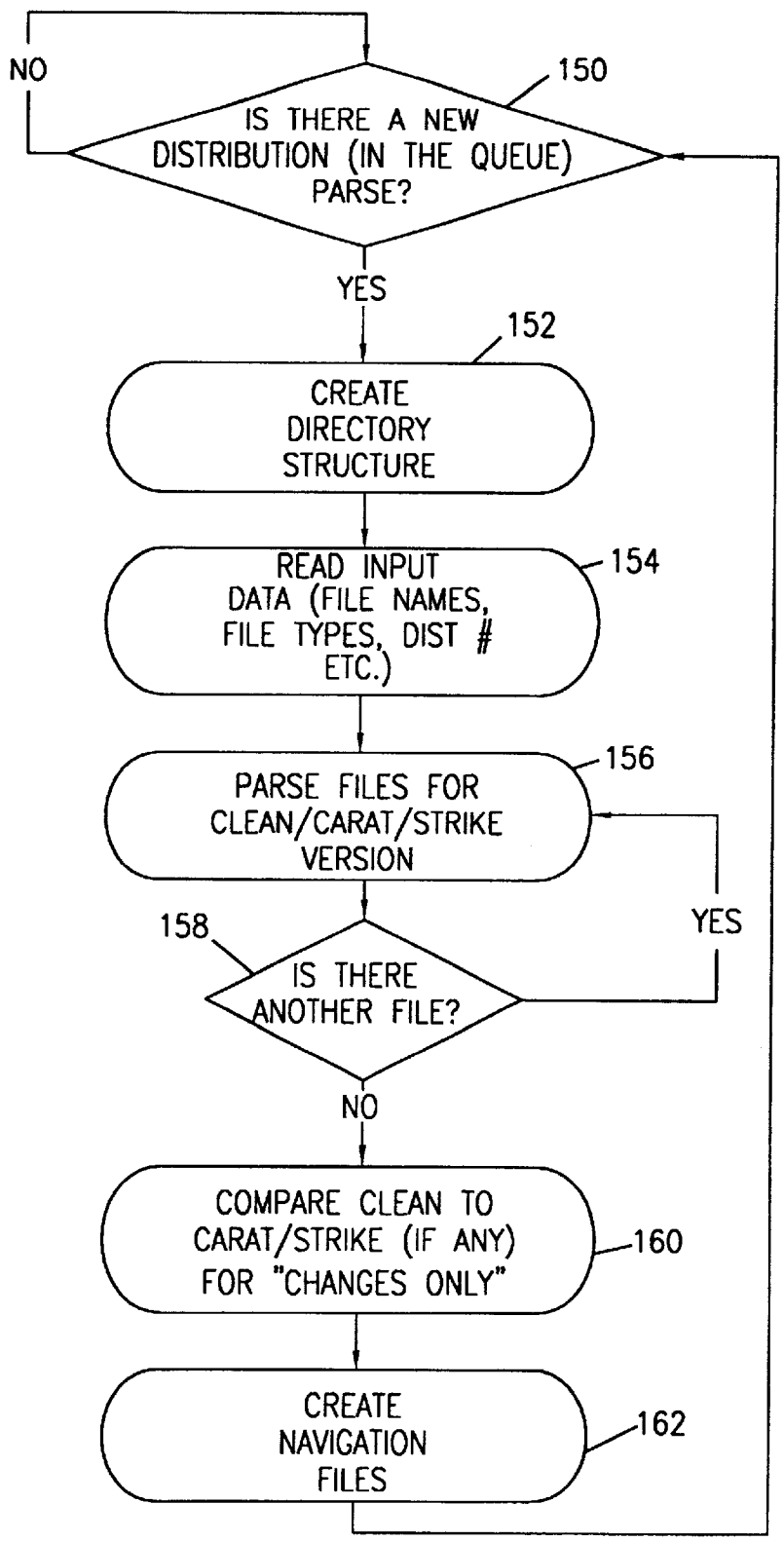
FIG. 5 is a flow diagram illustrating processing performed by a parsing server of the document management system of the present invention.

Parsing procedure 82 is performed by parsing server 54 having a parsing queue as shown in FIG. 1. As shown in FIG. 5, parsing procedure 82 preferably operates as an infinite loop which processes documents 72 from a distribution 70 placed in the parsing queue after the distribution documents have been successfully uploaded and selected for processing by the administrator. The parsing server loop begins with a looping search 150 in which the parsing queue is checked to determine whether a new distribution is present in the parsing queue which is ready for processing. Once a new distribution 70 is found in the parsing queue, a distribution file directory structure is created in a step 152 to organize, in a single location, all of the document files in the distribution as well as additional files which will be created for processing the distribution. The directory structure may include directories organized by the name of a project encompassing the distribution, as well as subdirectories identified by the particular distribution (e.g. by a sequential distribution version number) being processed.

Input data is next read in a step 154. Such input may include, for example, the filename of each document 72 in the distribution 70, the filetype of each document 72, the distribution number, etc. The filetype preferably indicates whether the document 72 is a divisible document 74 or an indivisible document 76. If the document 72 is a divisible document 74, the filetype may indicate the parsing rules to be used for parsing the document as described below. The documents 72 in the distribution 70 are preferably processed to generate individual files for each document 72 in the distribution 72, to assign an identifier to each file, and to link or otherwise relate the files to one another. In the preferred HTML environment, each of these files would constitute a single HTML or web page.

Next, each document 72 in the distribution 70 is parsed in a step 156. As noted above, the distribution preferably includes both clean versions of the documents 72 as well as versions which indicate revisions from the previous distribution by way of carets, strikethrough or the like. Each document, in each revision format (clean/caret/strikethrough) is parsed in step 156. Parsing continues until it is determined in a step 158 that there are no additional documents in the distribution to be parsed.

The clean versions of each document in the distribution are then compared in a step 160 to the respective document versions in the same distribution which denote revision by caret, strikethrough or the like to determine which documents have been revised since the previous distribution. This will enable participants 20 to select only revised documents for or document segments for review, if desired, as will be described below. Finally, navigation files are created in a step 162 for use in a navigation window displayed in the browsers 24 of a participant computers 22. Such navigation files enable participants to browse through various projects, select a table of contents or a table of distributions for a particular project for viewing, select a revision format (clean, caret, strikethrough, changes only, etc.), print or comment upon a document or a segment of a document, or navigate through previous and next segments of a divisible document.

Figure 6:
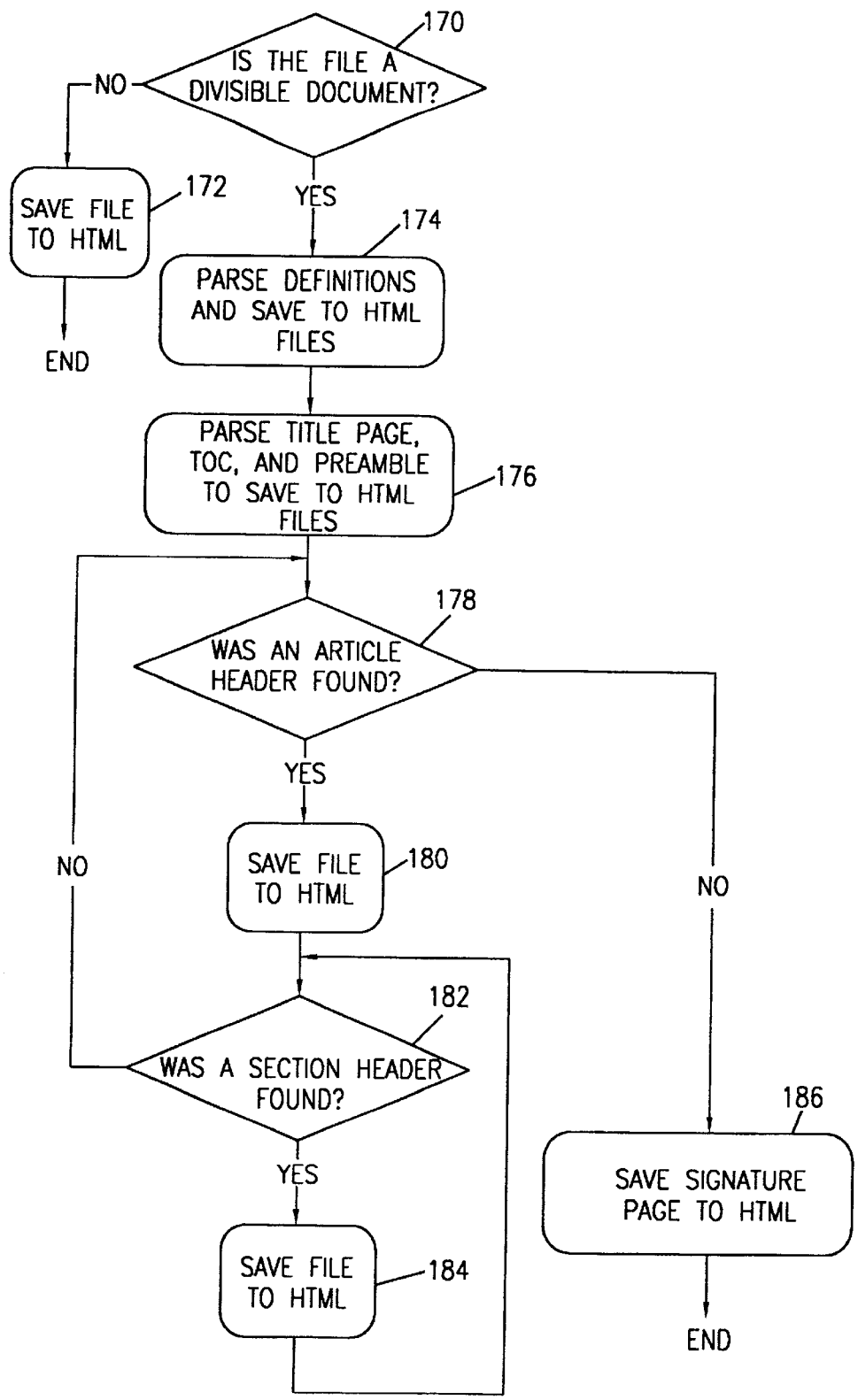
FIG. 6 is a flow diagram illustrating the parsing of documents in accordance with the present invention.
Figure 7:
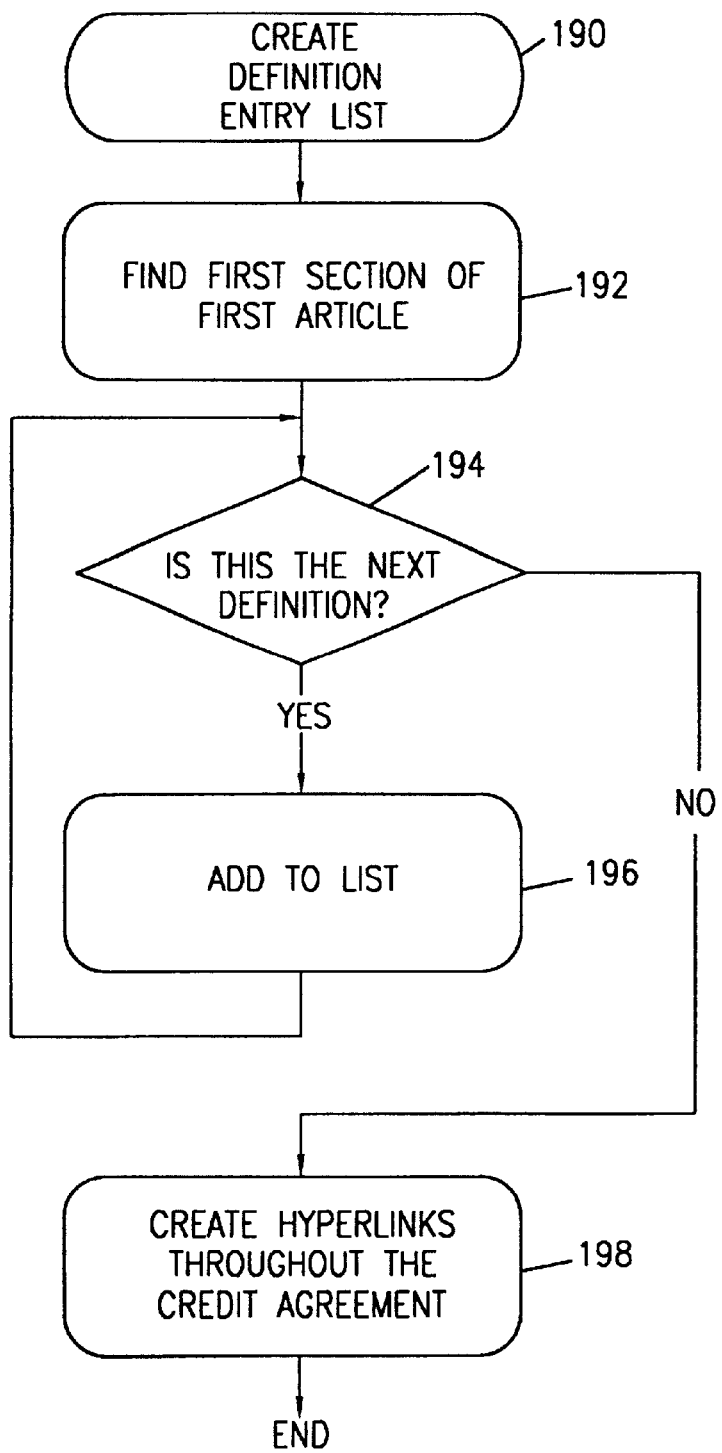
FIG. 7 is a flow diagram illustrating the parsing of definitions within a document in accordance with the present invention.

Parsing documents 72, and segmentation of divisible documents 74, will now be described with reference to FIGS. 6 and 7. Parsing and segmenting a divisible document 74 requires that the divisible document 74 is written to follow certain structural rules for headings and/or breaks to allow the parsing procedure to properly segment the document. The structural rules may change from divisible document to divisible document, but should remain consistent throughout different versions or distributions of the same divisible document.

Many types of documents lend themselves to adhering to simple structural rules for headings and therefore may be easily parsed and segmented. Credit Agreements for Syndicated Loan Systems are one such type of divisible document, as are multi-party legal agreements, jointly authored academic papers, and the like. The description of parsing divisible documents herein will refer to parsing a sample Credit Agreement for the sake of description, but it is to be noted that any type of structured document is encompassed by the present invention. The description of parsing indivisible documents 76 herein will refer to parsing exhibits, cover letters and assignments. These types of documents are commonly related to a Credit Agreement and would therefore be included in the same project, and therefore in some or all of the same distributions, as the Credit Agreement. However, these indivisible documents 76 ordinarily do not require any segmentation. Nevertheless, with proper structuring, these documents could be made into divisible documents, if desired.

The Credit Agreement comprising a divisible document 74, as well as the parsing procedure 82, will utilize the following parsing rules in the present example:

| SEGMENT NAME | PARSING RULES |
| --- | --- |
| Title Page | Everything preceding "Table of Contents" |
| Table of Contents | From "Table of Contents" through "Credit Agreement" |
| Credit Agreement (Preamble) | From "Credit Agreement" to first appearance of "Article" |
| Articles | From one appearance of "Article" to either: (1) next appearance of "Article"; or (2) "In Witness Whereof" |
| Sections | From one appearance of "Section" to either: (1) next appearance of "Section"; or (2) next appearance of "Article"; or (3) "In Witness Whereof" |
| Signature Page | From "In Witness Whereof" to end of document text |

It is to be noted that in most Credit Agreements of the type described above, the first Section of the first Article (such as Article 1, Section 1, or Section 1.1, or Section 1.01 as the case may be) will be a "Definition of Terms" section, and therefore it will be known that the definitions necessary to create hyperlinked definitions for defined terms in the document are contained in this section. Alternatively, a separate section entitled "Definitions of Terms" or the like may be included in the document and a corresponding rule searching for this term may be included in the parsing procedure 82. The parsing procedure 82 therefore divides the Credit Agreement into the following segments:

Title Page

Table of Contents

Credit Agreement (Preamble)

Each Definition

Each Article

Each Section

Signature Page

Figure 2B:
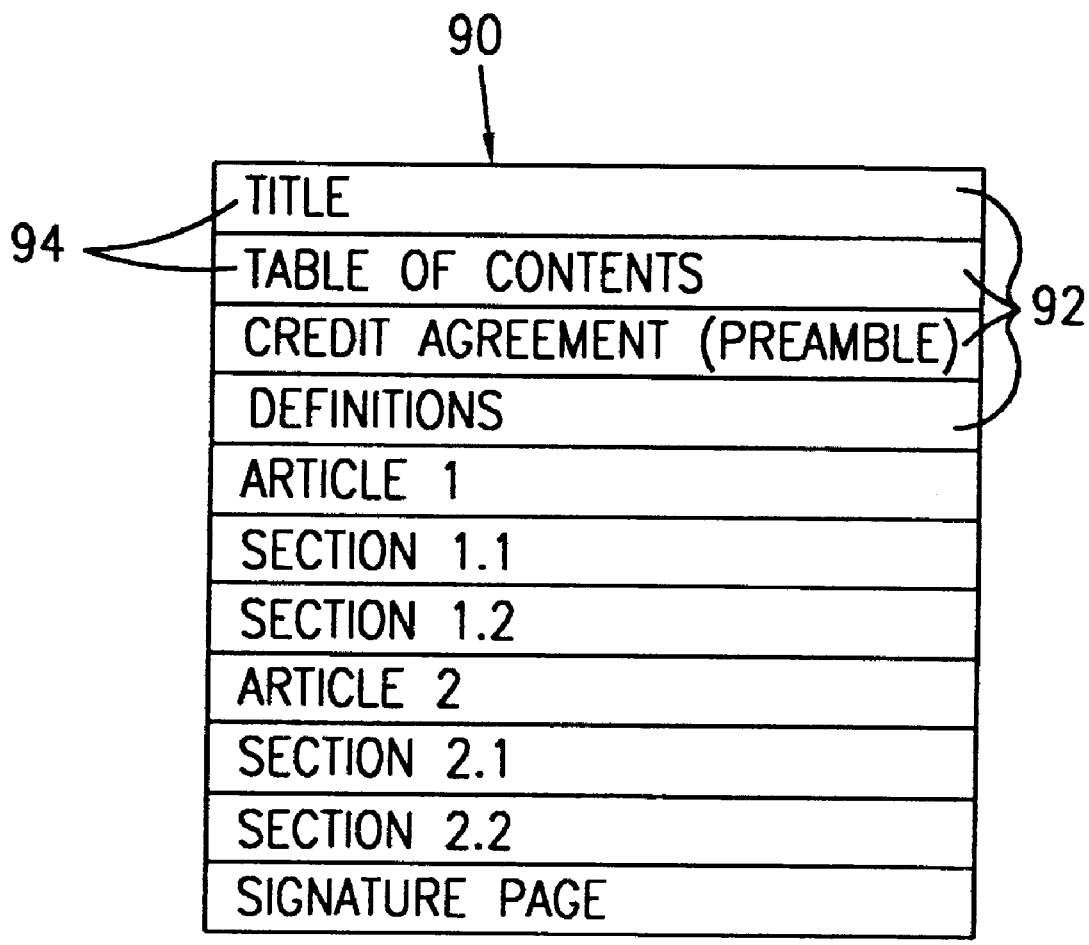
FIG. 2B depicts a document data structure for managing and processing divisible documents in accordance with the document management system of the present invention.

FIG. 2B illustrates a segmented document data structure 90 embodying a Credit Agreement parsed and segmented in the manner described above. Segmented document 90 embodying the Credit Agreement described above is shown as a group of segments 92 parsed in the manner described above. In the example of FIG. 2B, there are two Articles, each of which includes two Sections.

In addition to the segments 92 detailed above, it is preferable to divide the segment 92 containing the Definitions of Terms into further segments, each of which contains a single definition for improved loading speed in an HTML environment. Moreover, the parsing procedure 82 may create segments corresponding to a group of sub-parts of a divisible document as well as a segment corresponding to each sub-part. For example, in a Credit Agreement, it is preferable to provide a segment 92 for each Article, which segment includes the contents of the entire Article including the contents of each Section within that Article, as well as a separate segment 92 for each individual Section.

Parsing the documents 72 within a distribution 70, denoted in step 156 of FIG. 5, will now be explained in greater detail with respect to FIGS. 6 and 7. As shown in FIG. 6, parsing an individual document 72 begins with a step 170 in which the document 72 is checked to determine whether it is a divisible document 74. In the present example, the only divisible document 74 in the distribution 70 is the Credit Agreement described above. Accordingly, for all files which are not the Credit Agreement, such as exhibits, cover letters and assignments, these documents are indivisible documents 76 which are simply saved as entire HTML files in a step 172. Parsing for these indivisible documents 76 is complete at this point.

The Credit Agreement, corresponding to divisible document 74 of FIG. 2A, is first parsed for definitions in a step 174. Parsing the Credit Agreement continues by locating the title page, table of contents and preamble in the Credit Agreement and creating a file or HTML page for each such portion of the Credit Agreement in a step 176 in accordance with the parsing rules described above. Each of these files or HTML pages comprises a segment 92 as shown in FIG. 2B, and is preferably provided with an identifier 94 such as "Title" or "Section 2.1". Identifiers 94 may be assigned either based on the content of the divisible document 74 or by an administrator during the parsing process.

Articles and Sections of the Credit Agreement are then processed in two loops. An article loop begins with a step 178 in which the Credit Agreement is parsed for individual "Article" headers to locate the Articles within the Credit Agreement. A section loop then begins with a step 182 in which each Article is parsed for individual "Section" headers to locate each Section within the Article currently being processed. Each Article and Section is assigned an individual segment file or HTML page comprising a segment 92 in steps 180 and 184 respectively. The Article and Section parsing ends when no further Articles are found in step 178, after which the signature page segment is saved as a segment file or HTML page in a step 186. It is to be noted that the article and section loops described herein are generally applicable to parsing any document hierarchy which includes primary segment levels (e.g. Articles) comprising secondary segment levels (e.g. Sections). It is also to be noted that the invention embraces any number of segmentation levels (that is, the invention is not limited to only two segment levels).

Several distinct files are preferably kept for parsed documents to speed processing and viewing thereof. In particular, one file is preferably maintained for each indivisible document 76. In addition, one file is preferably maintained for the entirety of each segmented, divisible document 74, and one file is also preferably maintained for each segment 92. Thus, for example, in a divisible document whose content is structurally divided into multiple "Articles," each Article containing multiple Sections, a file may be kept for each Section segment individually and a larger file may be kept for each Article segment grouping therein the content of all of the Sections under that Article. In this way, a participant 20 may select from a number of hierarchical levels for viewing a divisible document, and only that level which is selected by the participant 20 needs to be downloaded to the participant 20 across network 30, thereby speeding processing. Furthermore, in conjunction with the hyperlinked definition parsing described below, a separate file is preferably maintained for each defined term in the document as well.

Parsing definitions in a divisible document 74, in accordance with step 174 of FIG. 6, will now be described in greater detail with reference to FIG. 7. Parsing definitions begins by creating a definition entry list in a step 190. The definition entry list is initially an empty data structure into which defined terms and their corresponding definitions will be stored during definition parsing. Definition parsing continues by locating the portion or portions of the document containing the defined terms in a step 192. The defined terms are preferably located in accordance with the parsing rules described above. Preferably, the Credit Agreement or other divisible document 74 contains defined terms in the first Section of the first Article of the document. In addition or in the alternative, the document may be searched for words or phrases which begin a new paragraph, and which are underlined or set off by quotation marks, and which are followed by a sentence. These three conditions thus may comprise an additional parsing rule, and similar parsing rules may be devised to signify and locate such defined terms.

Each definition is located in the document in step 194 and added to the definition entry list in step 196. Individual files or HTML pages may be created for each of the definitions. In a final step 198, the document is searched for all defined terms, and a hyperlink tag is inserted in the document for each such defined term to signify that the term is defined and to permit participants 20 to easily locate the definition of the defined term by selecting the hyperlink as described below.

After parsing the documents 72 in a distribution 70, an interactive table of contents may be created and formatted, such as in step 162 (FIG. 5) of the parsing process. The interactive table of contents presents each of the documents 72 in the distribution 70, as well as the segments 92 allocated by the parsing procedure outlined above, in an organized format and allows participants 20 to easily navigate through documents and document segments. Using the hierarchical structure of the segmented divisible document(s) including Articles and Sections and the particular order and structure of segments of divisible documents, the table of contents may be correspondingly hierarchically structured for ease of reading of the documents. The interactive table of contents is preferably hyperlinked to allow participants 20 to quickly access any document in the distribution and any segment or group of segments in a document by selecting an associated heading in the table of contents.

Referring again to FIG. 3, after the parsing procedure 82 is complete, the distribution 70 may be "released" in a step 84 to participants 20 through the document management system 10 and the network 30. The release procedure typically involves notifying participants 20 that the new distribution is ready for review and enables participants 20 to gain access to the new distribution, including the parsed and segmented documents created as described above, through the computer network 30 and the document management system 10. Only at this point are participants 20 permitted to access the new distribution (other than a participant acting as a central revisionist 28 or an administrator, if applicable). In particular, each of the participants 20 having authorization to access the new distribution may view each document contained in the distribution. Upon accessing the document management system 10 of the present invention, each participant 20 is preferably presented with a selection of all of the distributions of a selected project which have been created and released to date. In this manner, a participant 20 may view and ascertain the historical evolution of the document or documents 72 within a project from distribution to distribution.

Once the distribution has been released, comments from the participants 20 are collected and associated in a procedure 86 which may include at least some of the following elements. Participants 20 are able to create comments pertaining to particular documents or segments as desired, and document management system 10 associates comments with the document or segment to which it pertains. Participants 20 may also be allowed to view comments created by other participants pertaining to the distribution in question, and may respond to or otherwise comment upon comments previously created by other participants. This facilitates intelligent communication and discussion of discrete portions of documents, and in particular, allows commenting on divisible documents on a segment-by-segment basis.

FIGS. 8A and 8B illustrate data structures created and processed by the document management system 10 of the present invention for storing comments made by participants 20 and associating these comments with documents or segments of documents to which they pertain. The receiving, storage, sorting, and association of comments with documents or segments is performed by the comment view/send module 64 of FIG. 1.

FIG. 8A shows a comment table 300. Comment table 300 includes one or more comment entries 302. Each comment entry 302 is divided into fields which contain information necessary to store the substance of each comment (i.e. the text of each comment) and to allow the comment to be associated with the document or segment to which it pertains, as well as to allow the document management system 10 to sort the comments as desired.

Each comment entry 302 contains a number of identification fields. A comment ID field 304 is preferably provided to assign a unique identifier, such as a sequential number, to each comment. A user ID field 306 is provided to identify the participant 20 who is the author of the comment. A project ID field 308 is preferably provided to identify the project to which the comment pertains. A version ID field 310 is also preferably provided to identify the pertinent version or distribution of documents within the identified project to which the comment is directed. A time and/or date stamp field 312 may also be provided to identify the time and date when the comment was submitted, which therefore allows sorting of comments on this basis. A comment text field 314 is provided to store the text or other content of the comment submitted by the participant 20. A subject field 316 may be provided to allow a participant 20 to enter a subject line for the comment.

Each comment entry 302 further includes fields which associate the comment with the particular document and/or segment of a divisible document to which the comment is directed. Preferably, a segment file name field 320 is provided to identify the name of the file containing the document or segment to which the comment is directed. The segment file name preferably corresponds to the file containing the document or segment being viewed by the author of the comment when the comment was created.

In addition, a segment name field 322 is also provided in each comment entry 302 to identify the segment to which the comment pertains. Like the segment file name, the segment name is preferably obtained from the segment viewed by the author of the comment when the comment was created. The subject field 316 for each comment preferably defaults to the segment name in the segment name field 322 for the comment, although the subject field may be edited by the author of the comment when the comment is created. The segment name may constitute a segment identifier 94 of a segmented document 90 as shown in FIG. 2B, or may instead comprise an identifier which indicates that the comment pertains to the entire document. It is to be noted that the segment name will always indicate the entire document when the segment file name refers to an indivisible document 76, while the segment name may indicate either the entire document or a segment identifier 94 when the segment file name 320 refers to a divisible document 74. Thus, each of the segment file name field 320 and the segment name field 322 uniquely associates the comment with a particular document or segment thereof. Moreover, the combination of the project ID field 308 and the version ID field 310 identifies the particular project and version to which the comment pertains.

While the preferred method of associating comments with particular documents or document segments uses document names and segment identifiers as described above, it is to be understood that the invention encompasses any method of associating comments with documents or segments, and various other methods may be employed for this purpose. For example, instead of a document name and segment and identifier, a pointer to the associated document or segment could instead be stored in each comment entry 302 in the comments table 300. In addition, the identifiers or pointers could alternatively be stored together with the document or segments themselves instead of with the comments, in which case the identifiers or pointers would identify or point to the comments associated with the document or segment. Any method of associating comments with the documents or segments to which they pertain is encompassed by the present invention.

FIG. 8B shows a participant/comment table 340. Participant/comment table 340 indicates the status of each comment with regard to each participant 20. The participant/comment table 340 includes one or more participant/comment entries 342. Each participant/comment entry 342 includes a comment ID field 344, a user ID field 346, and a status field 348. The comment ID field 344 contains a comment ID corresponding to those assigned to each comment and stored in comment ID field 304 of comment table 300. Similarly, the user ID field 346 contains a user ID identifying a participant 20 in the same manner as user ID field 306 of comment table 300. It is to be noted that in most instances, a plurality of participants 20 will participate in the revision of the documents comprising a particular project. For this reason, the participant/comment table 340 may contain several participant/comment entries 342 for each comment ID, and preferably contains one participant/comment entry 342 for each participant 20 involved in the particular project at issue.

The status field 348 indicates the comment status for the participant 20 identified by the user ID field 346 in the entry. The status may include, for example, read, unread, saved, archived, etc. The status field 348 will enable the comments to be further sorted by the view/send comments module 64 for viewing and printing by participants 20. For example, a participant 20 may wish to view only those comments for a particular document segment which are unread by that participant 20. To accomplish this, the view/send comments module 64 would search the comment table 300 to find all comments pertaining to the desired document segment for the desired project and distribution, and would then check the participant/comment table 340 to determine which, if any, of these comments are unread by the requesting participant 20. Only these unread, matching comments would then be displayed. Indeed, since this sorting is preferably provided by document management system 10, only information pertaining to matching comments would need to be downloaded to the participant 20 across the network 30, thereby increasing processing speed and efficiency. It is to be noted that it is preferable to download only comment headers (containing information sufficient to present a brief description of each comment) across the network when a participant is browsing through comments. An entire comment (including the text or other substance of the comment itself) is preferably downloaded only when that particular comment is selected by a requesting participant. The creation and viewing of comments will be described in greater detail below.

Referring again to FIG. 3, after the participants have finished creating and submitting comments, the document or documents 72 in the distribution 70 may be revised based on the comments of the participants 20 in a revision procedure 88. The revision of the documents 72 in this procedure 88 may be accomplished by the central revisionist 28 who may either be one of the participants 20 or a non-participant whose sole task is to revise the documents 72 based on the comments. Once the documents in the distribution have been appropriately revised, the revised documents are grouped into a new distribution which is uploaded in new distribution upload procedure 80.

The navigation and viewing of documents and the creation, submission and viewing of comments by participants 20 will now be described with reference to FIGS. 9 and 10. FIGS. 9A–9D and 10A–10F show a customized participant interface, such as an HTML browser 24, for use in accordance with the present invention.

Figure 9A:
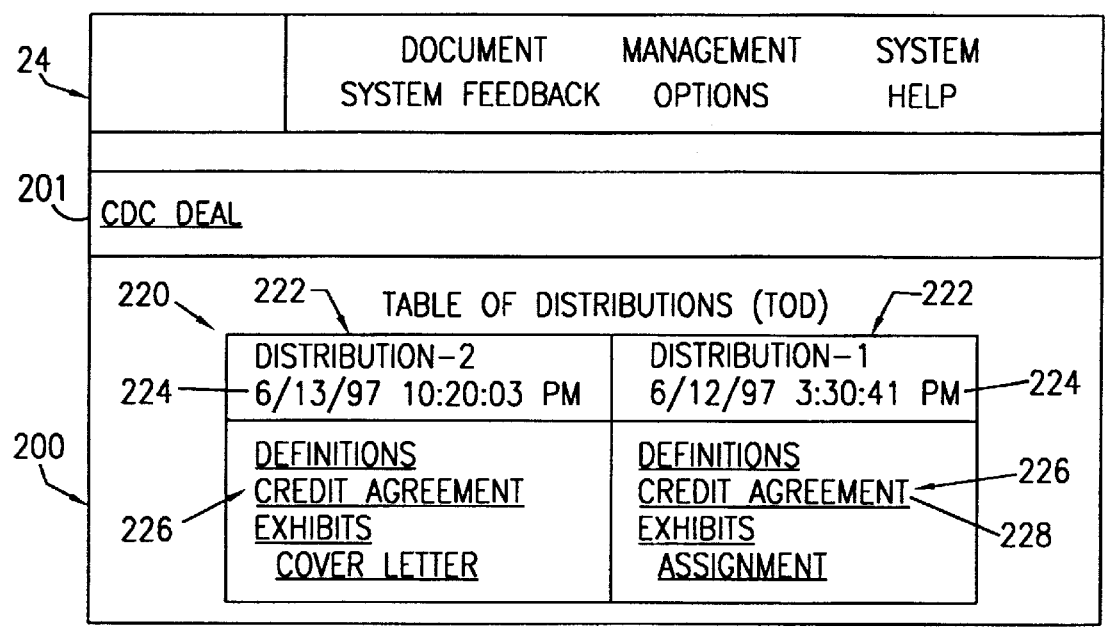
Figure 10A:
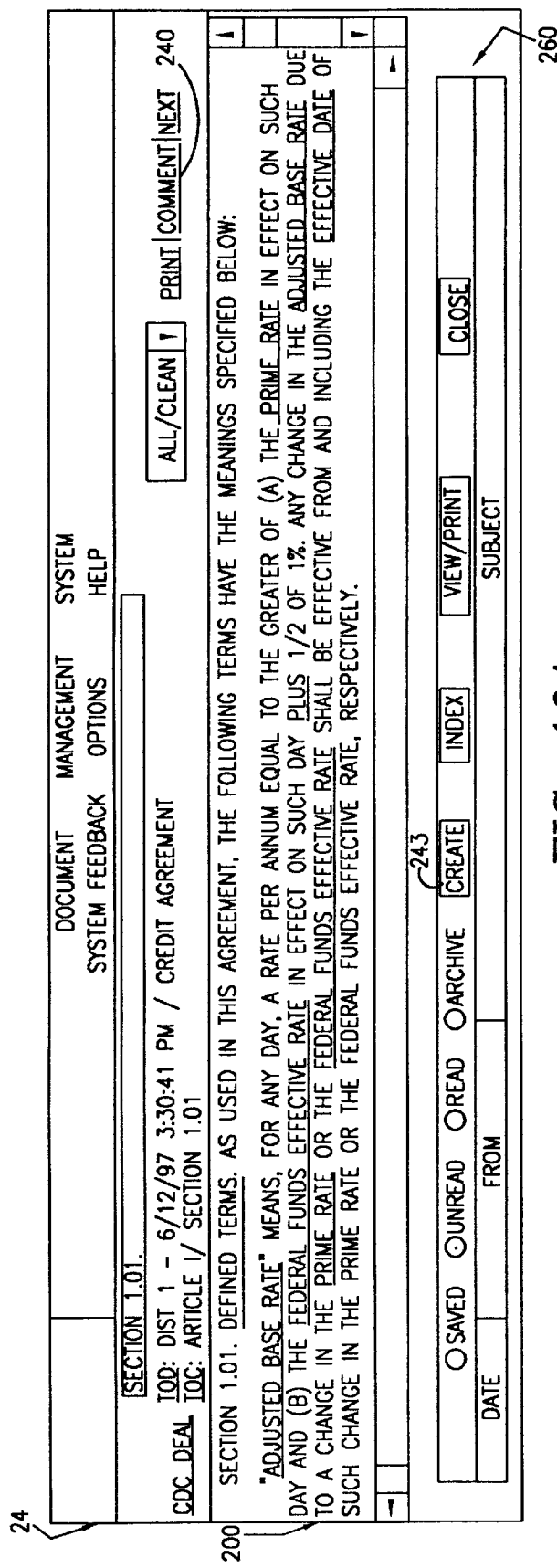
Figure 10C:
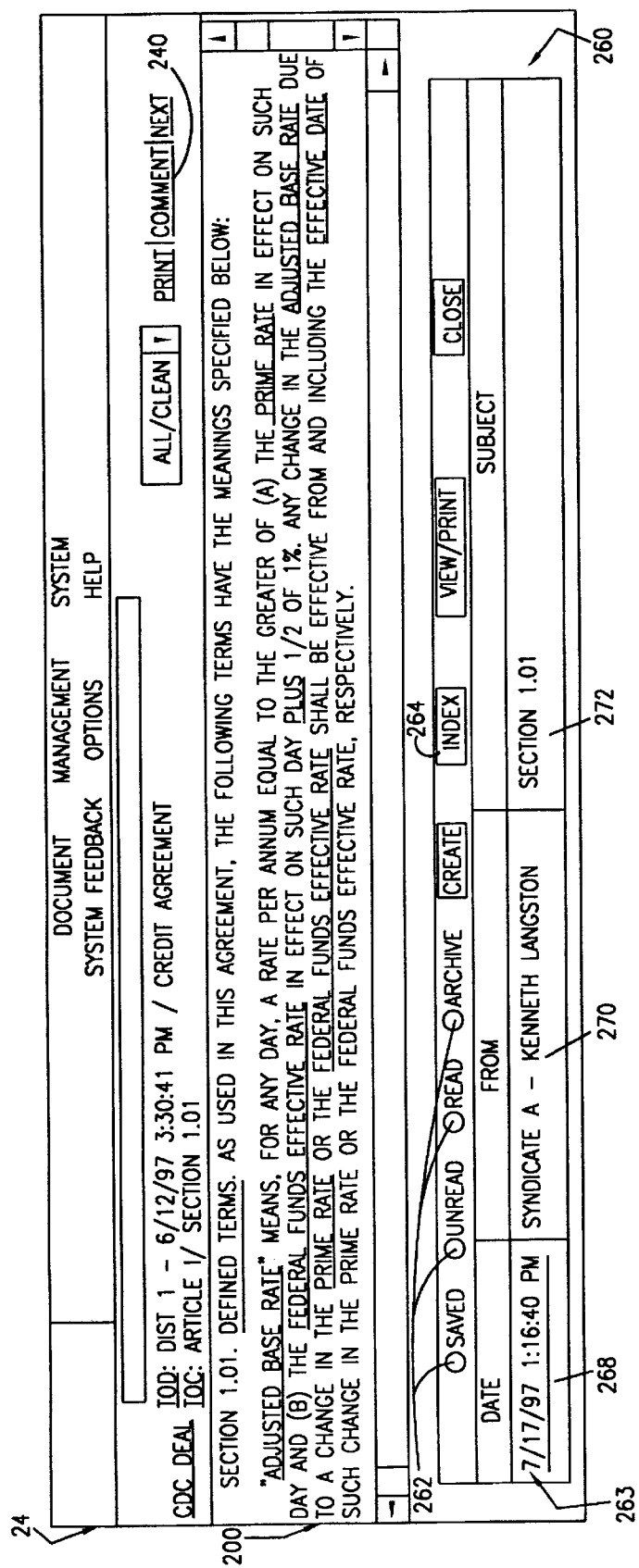
Figure 10D:
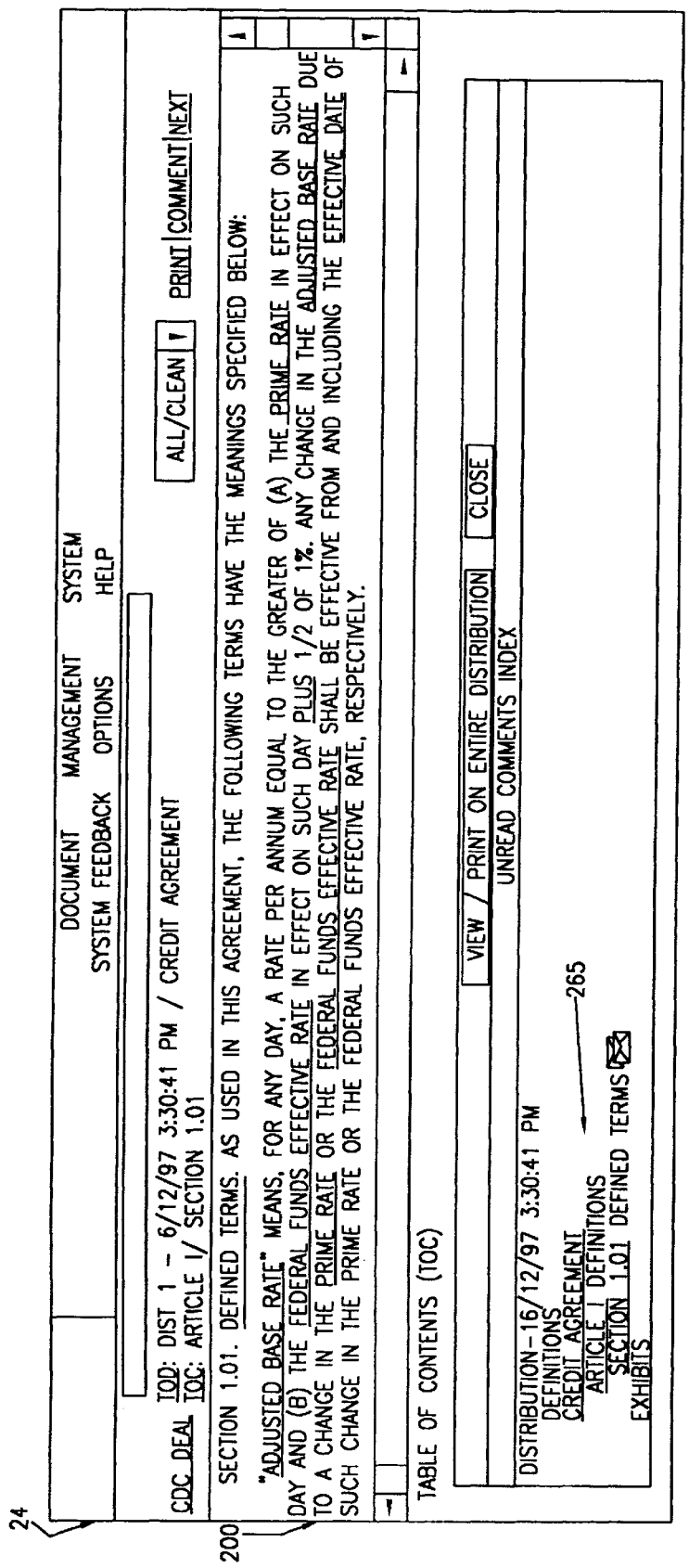

As shown in FIG. 9A, the browser 24 includes a viewing window 200 which displays information pertaining to the projects, documents and comments managed by the document management system 10. Upon a participant's selection of a particular project, the viewing window 200 preferably displays the project name or identifier 201 in a portion of the viewing window 200. In addition, a table of distributions 220 for the selected project is displayed in the viewing window 200. The table of distributions 220 includes one or more distribution summaries 222, one for each distribution of the selected project. In the example of FIG. 9A, two distribution summaries 222, namely Distribution-1 and Distribution-2, are shown. The time and date 224 at which each distribution was uploaded to the document management system 10 is also displayed. Each distribution summary 222 also includes a document list 226 which lists each of the documents included in that distribution. Preferably, each of the documents listed in the document list 226 is displayed as a hyperlink which may be selected to reveal the listed documents in the selected distribution.

Figure 9B:
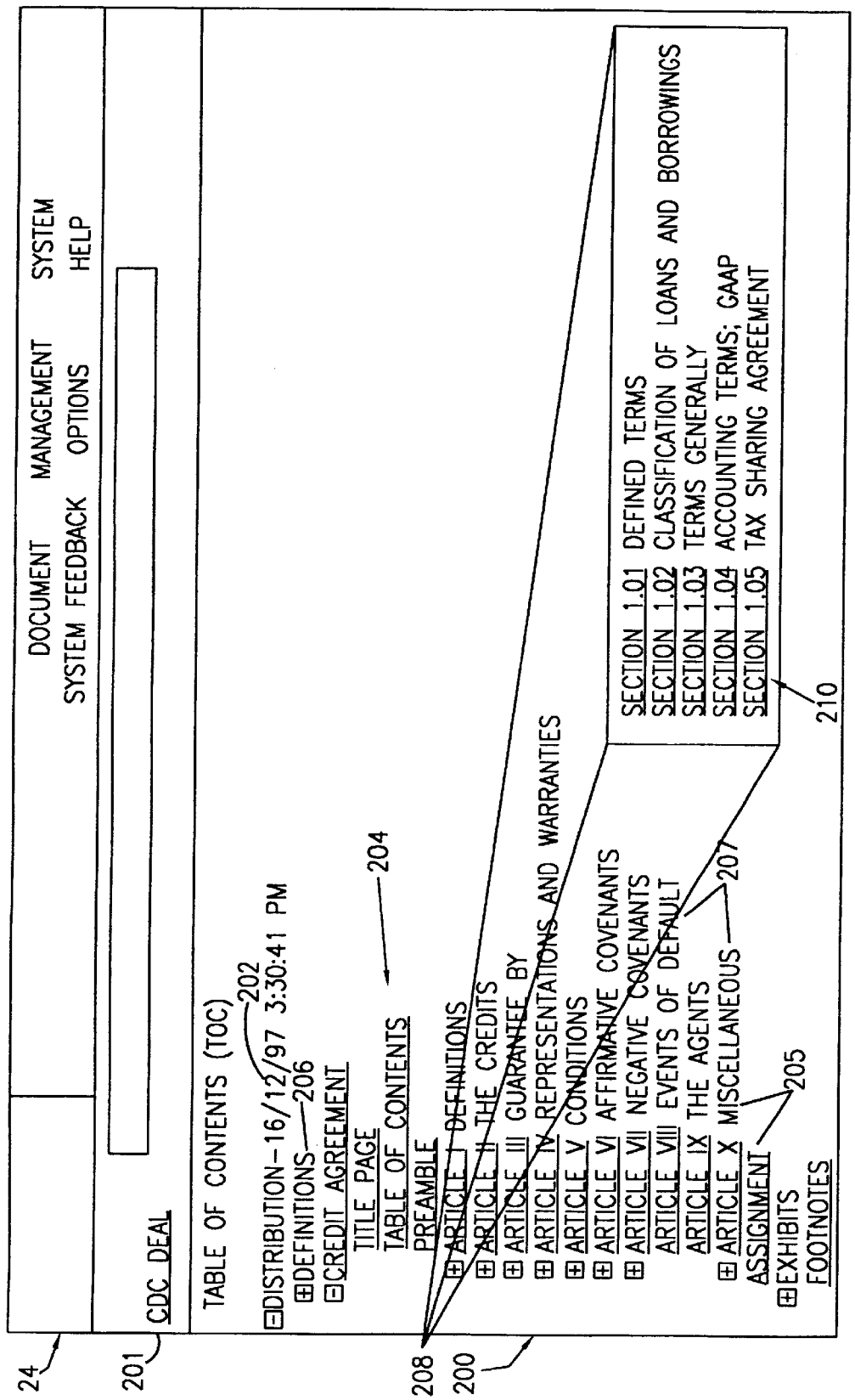

For example, as shown in FIG. 9B, upon selecting the hyperlink 228 for the Credit Agreement shown in FIG. 9A, the viewing window 200 preferably displays both the project name or identifier 201 and the distribution date and time 202 for the selected distribution (in this case, Distribution-1). Beneath the distribution date and time 202 the interactive table of contents generally referred to as 204 is preferably provided. The table of contents includes documents and headers or segment identifiers 205 identifying the documents and segments in the distribution. Text strings 207 may also describe each document or segment depicted in the table of contents 204. The descriptive text strings 207 may be parsed from a document itself or may be entered by an administrator during the parsing procedure 82.

The table of contents 204 shown in the example of FIG. 9B reflects the hierarchical structure of an underlying divisible document 74, in this case a Credit Agreement. In the present Credit Agreement example, the table of contents 204 begins with "Definitions" 206. Each entry in the table of contents 204 is provided with a button and/or hypertext link so that a participant 20 may select the button or hypertext link to expand the table of contents where appropriate to depict underlying structure in the hierarchy as well as to display the corresponding segment or segments of the document. Where the lowest structure in the hierarchy is already displayed, selecting a button or hypertext link of the lowest level will display the document text of the segment corresponding to that button or link. After the Definitions in the table of contents 204 appears the Credit Agreement preamble and the remainder of the Credit Agreement, separated into "Articles" each having a hypertext link and a descriptive text string.

As shown in FIG. 9B, selecting the button or hypertext link 208 for Article I would uncover the headers 210 beneath Article I in the document hierarchy: in this case, Sections 1.01 to 1.05. Selecting the button or hyperlink 208 for Article I may also display the beginning of the document text corresponding to Article I. These Sections are the lowest level in the hierarchy, and selecting one, such as Section 1.01, would display in the viewing window 200 the document text in from the segment corresponding to that Section as shown in FIG. 9C. In this example, Section 1.01 corresponds to the Defined Terms of the document, and each hyperlinked term 212 may be selected by a participant 20 to display a definition of the term from the Definitions segment (which, in this example, could also be accessed by selecting the button or hyperlink 206 for "Definitions" shown in FIG. 9B). Thus, as shown in FIG. 9D, if a participant 20 views the segment for Section 1.01 in the viewing window 200 of the browser 24, and the participant selects the hyperlink circled in FIG. 9D for the term "Administrative Questionnaire," the definition 214 for this term would quickly appear in a lower portion 216 of the viewing window 200. In this manner, the participant 20 may quickly determine that a term in the document has a special definition (by the presence of a hyperlink), and the definition may quickly be obtained, all without requiring the participant to leave the portion of the document being read.

In addition to viewing and navigating through the documents in a distribution as described above, participants 20 are also able to comment upon documents and segments thereof in a document collection and association procedure 86 (FIG. 3) provided by document management system 10. As shown in FIG. 10A, a participant 20 may wish to comment upon a particular segment of a divisible document, such as Section 1.01 of the Credit Agreement of the present example. To create such a comment, participant 20 may issue a command to engage the commenting feature of the present invention, such as by selecting a comment button or link 240 in the browser 24. Upon selecting the comment button 240, a comment frame 260 is displayed showing the comments submitted about the document or segment being viewed. In the example of FIG. 10A, the comment frame is empty, showing that no comments (accessible by the viewing participant) have yet been submitted for the segment shown in the viewing window 200.

A "Create" button 243 may then be selected, and a comment creation frame 242 is displayed in a lower portion of the viewing window 200 as shown in FIG. 10B. The author 245 and date and time 247 of the comment are preferably automatically entered by the system into the appropriate fields of the comment creation frame 242 as shown. In addition, the header or segment name 249 of the segment or document being viewed in the viewing window 200 is preferably entered into the subject field of the comment creation frame 242. In the example of FIG. 10B, the subject would be Section 1.01.

Comment text 244 may be entered by the participant 20, and recipients of the comment (the distribution list for the comment) may be selected as desired. In the present example, the recipients may be selected from a recipient selection bar 246 which allows groups of recipients to be selected or unselected by simply checking or unchecking recipient selection boxes 248. The individual recipients within such groups may be displayed by selecting a "Show Recipients" button 255.

Recipients may be designated for each comment to permit the document management system 10 to selectively provide comments to designated recipients as desired by the participant-author 20 of the comment. This may be accomplished by, for example, creating participant/comment entries 342 only for designated recipients of the comment and restricting access to comments by a participants 20 to only those comments for which a participant/comment entry 342 exists for a particular participant 20 requesting such comment.

In addition, the participant 20 may select a "Copy/Paste" button 254 which can either inform the participant 20 of how to use the participant's browser to copy or to cut and paste portions of the document 70 into the comment text 244, or can perform such copying or cutting and pasting for the participant 20. When the participant 20 is satisfied that the comment is complete, the comment may be sent by selecting the "Send" button 250, cancelled by selecting the "Cancel" button 252, or delayed by selecting the "Save" button 251.

When comments are issued by participants 20 in the manner described above, they are routed through the network 30 to the document management system 10, which collects and organizes them according to the document and, if applicable, to the segment or segments to which they apply. This is accomplished by creating a comment entry in the comment table 300 and one or more participant/comment entries 342 in the participant/comment table 340 as shown in FIGS. 8A and 8B. Some of the information stored in the these entries, such as the text of the comment, is entered by the author of the comment, while other information, such as the segment file name and date and time of the comment, is obtained automatically by the document management system. As described above, each comment preferably contains the text of the comment, as well as the participant who authored the comment and other useful information such as the time and date at which the comment was created to allow the document management system 10 to sort the comments.

Participants may also view comments during the comment collection and organization procedure 86. This is preferably accomplished by once again selecting the comment button or link 240 which displays the comment frame 260 in the lower portion of the viewing window 200 as shown in FIG. 10C. A participant 20 may select particular comments for viewing by selecting one of the comment view buttons 262, which preferably allow a participant 20 to select comments for viewing based upon their status, such as comments which are unread by that participant 20, comments which have been read by that participant 20, or comments which have been read by the participant 20 but were placed in a file for later retrieval. Alternatively, a participant may select to view an index of all comments by selecting an "Index" button 264 which preferably displays a comments index 265 as shown in FIG. 10D. The comments index 265 is an interactive table of contents which only displays those documents or segments which have comments associated with them. Thus, the comments index 265 allows participants 20 to quickly determine which segments of the document have been commented upon and require review.

Referring again to FIG. 10C, once the participant 20 has selected the manner in which the participant wishes to view the comments for a particular document or segment, (which may be selected on the basis of the document or segment shown in the viewing window 200), the comment headers 263 pertaining to the selected document or segment are shown in the comment frame 260. Because only those comment headers pertaining to the chosen document or segment are displayed, the participant 20 is not burdened with looking through comments that are irrelevant to the document or portion thereof which is of interest. As a result, evaluation by participants and/or the revisionist of documents and comments is greatly facilitated. Preferably, each comment header 263 is displayed in a table showing the date and time 268 when the comment was issued, the author 270 of the comment, and the subject 272 of the comment.

One of the fields in each table entry for the comments in the comment frame 260 is preferably provided as a hypertext link which, when selected, displays the entire comment, and this hyperlinked field is preferably the date and/or time 268 of the comment. When a hyperlink for a comment is selected, a comment viewing frame 280 is displayed in a lower portion of the viewing window 200 as shown in FIG. 10E. The comment viewing frame 280 preferably displays the date and time 247, author 245, subject 249 and the entire text or other substance 244 of the comment. The comment viewing frame 280 further preferably displays the distribution list 281 for the comment which indicates each of the participant-recipients of the comment. The comment viewing frame 280 also preferably provides the participant 20 with the ability to print the comment, save the comment as unread, file the comment in a file for later retrieval, and to close the comment viewing frame 280. In addition, the comment viewing frame 280 preferably further comprises a "Reply" option 282 which permits a participant 20 to reply to the author or originator of the comment shown in the comment viewing frame 280, as well as a "Reply All" option 283 which permits a participant 20 to reply to all participants who received the comment (i.e. the distribution list for the comment).

As shown in FIG. 10F, a comment reply frame 290 is displayed in the lower portion of the viewing window 200 when either the "Reply" option 282 or the "Reply All" option 283 is selected. A comment reply frame 290 is similar to the comment creation frame 242 with the exception that the recipient 292 is preassigned based on the author(s) of the comment to whom the reply is directed.

It is to be noted that viewing and navigating through the documents in a distribution and commenting upon the documents may occur in any order or by different participants simultaneously. That is, additional comments may be posted after comments entered previously by participants have been input.

It should also be noted that the comment viewing, and especially the organization and association of comments with the documents or segments to which they pertain, not only enhances the evaluation of the comments by participants, but also facilitates the duties of the revisionist of the distribution documents. In particular, during the document revision procedure 88 of FIG. 3, the revisionist may quickly select and review all of the comments which are relevant to particular documents and to any single segment of a divisible document. The revisionist need not first segregate and organize the comments manually to determine which documents or segments of divisible documents are affected by each comment since this task is accomplished by the document management system 10. Specifically, the organization and collection of comments is performed when the documents are created and sent by the participants because the comments are automatically associated by the document management system 10 with the segment selected or being viewed by the participant at the time the comment was created. As a result, the duties of the revisionist are greatly reduced, and attention can be focused solely on properly revising each portion of the document in light of the content of the relevant comments received from each of the participants.

By providing a document management system in which a document is divided into segments based on its content and predetermined structural rules for the document, and by providing a data structure which enables participants to create and selectively send comments about the document which are associated with the particular segment or group of segments of the document to which they pertain, participants are able to evaluate, comment upon and effect the revision of documents more efficiently and more intelligently than by exchanging individually revised drafts from each participant, or by issuing comments which are not logically related to the portions of the document to which they pertain.

In addition, by dividing a document into segments based on the content of the document and predetermined structural rules for the document, an interactive table of contents may be created for the document by parsing the document itself. Moreover, by providing hyperlinks in the entries of the table of contents and organizing the entries according to the hierarchical structure of the document, enhanced document navigation and hierarchical understanding by participants is obtained. Furthermore, by providing a document management system which parses a document to automatically locate defined terms and by presenting each defined term in the document as a hyperlink which is linked to the definition of the term, and by further enabling the defined terms and the hyperlinks representing them to be automatically revised and updated with each revised version of the document, the understanding and evaluation of the document by participants is further enhanced by obviating the need to manually refer to the definitions of such defined terms.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A computerized method for managing the revision and/or evaluation of a document by a plurality of participants, the method comprising:

dividing an electronically stored document into a plurality of segments based upon the contents of the document and in accordance with a prescribed set of parsing rules;

sending notification to the plurality of participants that the document is available for review and revision;

receiving comments sent by one or more of the participants, each of the comments being associated with but not part of the document and relating to one or more of the segments, at least one of the comments relating to less than all of the segments; and associating each comment with the segment or segments to which it relates.

2. The method of claim 1, further including:

permitting the comments made by a first participant to be viewed by other participants.

3. The method of claim 2, wherein the first participant identifies which of the other participants can view his or her comments.

4. The method of claim 1, wherein comments received from the participants identify the particular segment or segments to which it relates.

5. The method of claim 4, wherein a participant initiates the comment sending process while viewing a segment of the document and the comment he or she sends is automatically identified as being related to the segment of the document he or she was viewing.

6. The method of claim 4, wherein at least one of the comments relates to more than one of the segments.

7. The method of claim 1, further including receiving requests from participants to review comments relating to a designated set of segments of the document.

8. The method of claim 7, further including permitting the participant to review comments relating to the designated set of segments only if the participant has authority to review such comments.

9. The method of claim 8, wherein the participant making the comment designates which of the other participants has authority to view the comment.

10. The method of claim 7, wherein the participant indicates that he or she only wants to see comments that he or she has not already viewed and wherein he or she is presented only those comments.

11. The method of claim 7, wherein the participant is shown a list of comments made by others and the participant selects the comments he or she w ants to view from that list.

12. The method of claim 7, wherein the participant is presented with categories of comments which he or she can view and he or she selects from that category.

13. The method of claim 1, further including uploading a version of a document onto a computer system for storage on the computer system before it is automatically divided.

14. The method of claim 1, wherein the dividing step is carried out by a microprocessor.

15. The method of claim 1, wherein the prescribed set of parsing rules is determined as a function of the type of document being divided.

16. The method of claim 1, wherein the prescribed set of parsing rules determines the beginning and end of a segment as a function of the structural hierarchy of the document.

17. The method of claim 1, wherein the prescribed set of parsing rules determines the beginning and end of a segment as a function of human readable headings in the document.

18. The method of claim 17, wherein the human readable headings are alphabetical letters.

19. The method of claim 1, wherein at least one of the comments relates to more than one of the segments.

20. The method of claim 1, wherein the entire document is stored as a single document and each section is stored as a separate document.

21. The method of claim 1, wherein each section is stored as a separate document.

22. The method of claim 1, wherein each section is stored as part of a respective related group of sections.

23. The method of claim 22, wherein the entire document is stored as a single document, each of the groups of sections are stored as respective documents and each of the individual sections are stored as a respective document so as to simplify downloading and processing thereof.

24. The method of claim 23, wherein each comment includes information designating which section and/or group of sections it relates to.

25. The method of claim 1, wherein the document includes a plurality of definitions of words and/or phrases contained in the document and wherein the method further includes automatically creating hyperlinks for each occurrence of a defined word and/or phrase to its associated definition.

26. The method of claim 25, further including the act of parsing the definitions from the document before the hyperlinks are created.

27. The method of claim 1, wherein the dividing, informing and receiving acts are carried out with respect to a plurality of versions of the document and the participants designate which of the versions he or she would like to view.

28. The method of claim 27, further including displaying the requested version of the document to the participants who requested such version.

29. The method of claim 1, wherein the dividing, informing and receiving acts are carried out with respect to a plurality of versions and the participants designate specific sections of multiple versions of the document to be viewed.

30. The method of claim 29, further including the act of displaying the requested specific sections of the multiple versions of the document to the requesting participant.

31. The method of claim 29, wherein when a participant makes a request to view comments relating to one or more segments, he or she is shown the comments relating to those segments for each of the versions of the document.

32. The method of claim 29, wherein when a participant makes a request to view comments relating to one or more segments, he or she is shown only the comments for those segments he or she has not previously reviewed.

33. The method of claim 1, wherein a plurality of projects are electronically stored and each of the projects includes a plurality of related documents.

34. The method of claim 33, wherein different participants have access to different projects.

35. The method of claim 34, further including creating a table of contents which identifies the various segments and that can be viewed by the participants.

36. The method of claim 35, wherein the table of contents includes hyperlinks to the various segments identified by the table of contents.

37. The method of claim 1, wherein revisions are made to the document based upon the comments and the revised document is stored as a new version.

38. The method of claim 1, wherein the document is stored in a central location and the comments are uploaded to the central location from participants who are remotely located from the central location.

39. The method of claim 38, wherein the comments are sent to the central location over a global computing network.

40. The method of claim 38, wherein revisions are made to the document based upon the comments and the revised document is stored at the central location as a new version.

41. The method of claim 40, wherein the revisions are made by a revisionist remotely located from the central location and are uploaded to the central location for storage.

42. The method of claim 41, wherein the participants are notified of the new version after it is uploaded to the central location.

43. The method of claim 42, wherein the notification takes place without human intervention.

44. Computerized method for managing the revision and/or evaluation of a document by a plurality of participants, the method comprising:

dividing an electronically stored document into a plurality of segments based upon the contents of the document and in accordance with a prescribed set of parsing rules;

sending notification to the plurality of participants that the document is available for review and revision;

receiving comments sent by one or more participants, each of the comments relating to one or more of the segments, at least one of the comments relating to less than all of the segments;

associating each comment with a segment or segments to which it relates;

receiving a request for a participant to review comments relating to a designated set of segments of the document; and permitting the participant to review comments relating to the designated set of segments only if the participant has authority to review such comments.

45. The method of claim 44, wherein the participant making the comment designates which of the other participants has authority to view the comment.

46. The method of claim 45, wherein the participant indicates that he or she only wants to see comments that he or she has not already viewed and wherein he or she is presented only those comments.

47. The method of claim 44, wherein the participant is shown a list of comments made by others and the participant selects the comments he or she wants to view from that list.

48. The method of claim 44, wherein the participant is presented with categories of comments which he or she can view and he or she selects from that category.

* * * * *